US012281521B2

(12) United States Patent
Smith et al.

(10) Patent No.: US 12,281,521 B2
(45) Date of Patent: Apr. 22, 2025

(54) LIMIT STOP ASSEMBLY FOR AN ARCHITECTURAL-STRUCTURE COVERING

(71) Applicant: Hunter Douglas, Inc., New York, NY (US)

(72) Inventors: Stephen P. Smith, Sandy Springs, GA (US); Nicholas E. Vanderkolk, Northglenn, CO (US)

(73) Assignee: Hunter Douglas, Inc., New York, NY (US)

( * ) Notice: Subject to any disclaimer, the term of this patent is extended or adjusted under 35 U.S.C. 154(b) by 455 days.

(21) Appl. No.: 17/845,135

(22) Filed: Jun. 21, 2022

(65) Prior Publication Data

US 2022/0316273 A1 Oct. 6, 2022

Related U.S. Application Data

(62) Division of application No. 16/437,026, filed on Jun. 11, 2019, now Pat. No. 11,396,773.

(Continued)

(51) Int. Cl.

*E06B 9/88* (2006.01)
*E06B 9/42* (2006.01)
*E06B 9/68* (2006.01)

(52) U.S. Cl.

CPC *E06B 9/88* (2013.01); *E06B 9/42* (2013.01); *E06B 2009/6809* (2013.01)

(58) Field of Classification Search

CPC ...... E06B 9/88; E06B 2009/6809; E06B 9/42; E06B 9/80; E06B 9/56; E06B 9/40; E06B 9/34

See application file for complete search history.

(56) References Cited

U.S. PATENT DOCUMENTS 3,965,960 A 6/1976 Massey
4,413,665 A 11/1983 Corcoran (Continued)

FOREIGN PATENT DOCUMENTS

EP 0210381 B1 12/1989
EP 3309347 A1 * 4/2018 ......... E06B 9/17046

(Continued)

OTHER PUBLICATIONS

Author Unknown, "How Safe are YOUR Window Shades? Part 1"—Insolroll—published Oct. 16, 2013, 2 pages.

(Continued)

*Primary Examiner* — Daniel P Cahn
*Assistant Examiner* — Jeremy C Ramsey
(74) *Attorney, Agent, or Firm* — KDW Firm PLLC

(57) ABSTRACT

A limit stop assembly for setting a travel limit position of a covering of an architectural-structure covering is disclosed. The limit stop assembly including a first state of operation and a second state of operation. The limit stop assembly being transitioned from the first state of operation to the second state of operation by moving the covering from a first position towards a second position. Transitioning the limit stop assembly from the first state of operation to the second state of operation automatically sets the travel limit of the covering for the second position. In one example of an embodiment, the limit stop assembly includes a screw shaft, a limit nut threadably received on the screw shaft, a hub, and a collar selectively movable between first and second collar positions.

19 Claims, 26 Drawing Sheets

Related U.S. Application Data

(60) Provisional application No. 62/683,992, filed on Jun. 12, 2018.

(56) References Cited

U.S. PATENT DOCUMENTS

| | | | | |
|---|---|---|---|---|
| 5,699,847 | A | 12/1997 | Villette et al. | |
| 5,709,349 | A | 1/1998 | De Chevron Villette et al. | |
| 7,240,715 | B2 | 7/2007 | Hoffmann | |
| 7,500,505 | B2 | 3/2009 | Smith et al. | |
| 8,662,139 | B2 | 3/2014 | Anthony et al. | |
| 9,328,555 | B2 | 5/2016 | Faller et al. | |
| 9,617,787 | B2 | 4/2017 | Bohlen | |
| 10,655,388 | B2 | 5/2020 | Smith et al. | |
| 10,731,408 | B2 | 8/2020 | Wei et al. | |
| 11,220,860 | B2 * | 1/2022 | Chen | E06B 9/90 |
| 2001/0001414 | A1 * | 5/2001 | Colson | E06B 9/32 160/321 |
| 2011/0139380 | A1 * | 6/2011 | Anthony | E06B 9/56 160/293.1 |
| 2014/0069595 | A1 | 3/2014 | Chen | |
| 2014/0096920 | A1 * | 4/2014 | MacDonald | E06B 9/80 160/405 |
| 2015/0376941 | A1 * | 12/2015 | Fujita | E06B 9/58 160/241 |
| 2017/0175440 | A1 * | 6/2017 | Bohlen | E06B 9/78 |
| 2018/0023340 | A1 * | 1/2018 | Goldberg | E06B 9/174 160/324 |
| 2019/0376339 | A1 * | 12/2019 | Cheng | E06B 9/80 |
| 2020/0123853 | A1 * | 4/2020 | Chen | E06B 9/90 |
| 2021/0156196 | A1 * | 5/2021 | Tao | E06B 9/42 |

FOREIGN PATENT DOCUMENTS

| | | | |
|---|---|---|---|
| JP | H07279560 | A | 10/1995 |
| JP | H07301066 | A | 11/1995 |
| JP | IPH0849484 | A | 2/1996 |
| JP | IPH08121062 | A | 5/1996 |
| WO | 2004007884 | A1 | 1/2004 |
| WO | 2013075747 | A1 | 5/2013 |

OTHER PUBLICATIONS

Author Unknown, “Slow-Rise Day/Nite Roller Shades”—Irvine Shade & Door, Inc.—retrieved Feb. 3, 2015, 1 page.

Author Unknown, “Roller Shade Installation Guide”—Blinds to Go™—published Dec. 8, 2011, 9 pages.

* cited by examiner

LIMIT STOP ASSEMBLY FOR AN ARCHITECTURAL-STRUCTURE COVERING

CROSS-REFERENCE TO RELATED APPLICATIONS

This application is a divisional application of pending U.S. patent application Ser. No. 16/437,026, filed Jun. 11, 2019, entitled "Limit Stop Assembly for an Architectural-Structure Covering," which application is a non-provisional of, and claims the benefit of the filing date of, U.S. provisional patent application No. 62/683,992, filed Jun. 12, 2018, entitled "Limit Stop Assembly for an Architectural-Structure Covering", the entirety of each application is incorporated by reference herein.

FIELD OF THE DISCLOSURE

The present disclosure relates generally to architectural-structure coverings, and more particularly to a system and method for establishing a travel limit (e.g., a retraction limit, an extension limit, or both) of an architectural-structure covering.

BACKGROUND OF THE DISCLOSURE

Architectural-structure coverings for architectural openings and/or structures (used interchangeably herein without the intent to limit), such as windows, doors, archways, portions of a wall, and the like, have taken numerous forms for many years. One known architectural-structure covering includes a covering such as a fabric coupled to a rotatable roller that is movable between an extended position and a retracted position. A drive mechanism enables a user to raise and lower the covering between the extended and retracted positions by, for example, winding the covering about the rotatable roller. To avoid over rotating, or snaring or jamming of the covering and/or the drive mechanism, some architectural-structure coverings include one or more stops located at, for example, the lower corners of the covering. In use, these stops may contact respective stops located on, for example, a headrail or end caps to which the rotatable roller is coupled to. Contacting of the stops provides a physical travel limit, for example, a retraction limit for the covering in the retracted position to prevent the covering from being overwound onto the rotatable roller. Additionally, some architectural-structure coverings include one or more stops in the headrail and/or within the rotatable roller to provide, for example, an extension limit for the covering in the extended position.

In many instances, installers need to manually set the travel limits (e.g., retraction and extension limits) of the covering. Many installers have found the process of setting the travel limits, especially, the retraction limit, to be difficult and time-consuming. Current manual approaches by installers to set the travel limit, for example, has led to increased installation time and inconsistent results.

It is with respect to these and other considerations that the present improvements may be useful.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

Disclosed herein is a limit stop assembly. In use, in one example of an embodiment, the limit stop assembly may be used in combination with known architectural-structure coverings having a covering rotatably coupled to a rotatable member for movement between an extended position (e.g., the covering is positioned away from or unwound with respect to the rotatable member) and a retracted position (e.g., the covering is positioned nearer to or wound about the rotatable member). In use, the limit stop assembly of the present disclosure provides an approach for setting a travel limit (e.g., retraction limit, extension limit, or multiple assemblies may be provided for setting both the retraction and extension travel limits) of the covering. In one example of an embodiment, the limit stop assembly provides an approach to set the travel limit, for example, the retraction limit of the covering. That is, for example, in one example of an embodiment, the limit stop assembly is used to set the retraction limit when the architectural-structure covering is initially retracted to a desired position so that future operation of the architectural-structure covering is constrained by the as-set retraction limit. Alternatively, in another example of an embodiment, the limit stop assembly provides an approach to set the travel limit, for example, the extension limit, of the covering. That is, for example, in one example of an embodiment, the limit stop assembly is used to set the extension limit when the architectural-structure covering is initially extended to a desired position so that future operation of the architectural-structure covering is constrained by the as-set extension limit. As described herein, the limit stop assembly can be used to set either the extension limit or the retraction limit, as such, any statements about setting the retraction limit of the covering apply likewise to setting the extension limit, and vice-versa.

Disclosed herein is also a limit stop assembly for use with an architectural-structure covering. In one example of an embodiment, the architectural-structure covering includes a covering coupled to a rotatable member and movable between an extended position and a retracted position. The limit stop assembly is adapted and configured for engaging the rotatable member so that rotation of the rotatable member rotates at least a portion of the limit stop assembly. In use, the limit stop assembly is selectively movable between a first state of operation or configuration and a second state of operation or configuration (used interchangeably herein without the intent to limit). In the first state of operation, for example, the limit stop assembly is arranged and configured to enable the covering to be moved from a first position (e.g., the extended position) to a second position (e.g., the retracted position) for purposes of setting a travel limit (e.g., a retraction limit) of the covering. Once the desired travel (e.g., retraction) limit for the second (e.g., retracted) position is reached, the covering is pulled or moved in the opposite (e.g., first) direction causing the limit stop assembly to transition or change to the second state of operation thereby setting the travel (e.g., retraction) limit of the covering for future operation. That is, in one example of an embodiment, the limit stop assembly is transitioned from the first state of operation to the second state of operation by moving the covering (in contrast with moving specifically a limit stop) from a retraction limit of the retracted position towards the extended position. Transitioning the limit stop assembly from the first state of operation to the second state of operation automatically sets the retraction limit of the covering for the retracted position (or the extension limit of the covering for the extended position).

Embodiments of the present disclosure provide numerous advantages. For example, providing a limit stop assembly that can be transitioned from a first state of operation to a second state of operation allows an installer, fabricator, etc. to set a travel limit of the covering by movement of the covering (e.g., retraction and/or extension) without further human intervention (e.g., without directly engaging the limit stop assembly), thereby easing installation of the architectural-structure covering as compared with existing limit stop setting approaches, in which an installer must manually and iteratively establish travel stops, typically requiring manual and/or direct manipulation of the limit stops.

Further features and advantages of at least some of the embodiments of the present disclosure, as well as the structure and operation of various embodiments of the present disclosure, are described in detail below with reference to the accompanying drawings.

Figure 1:
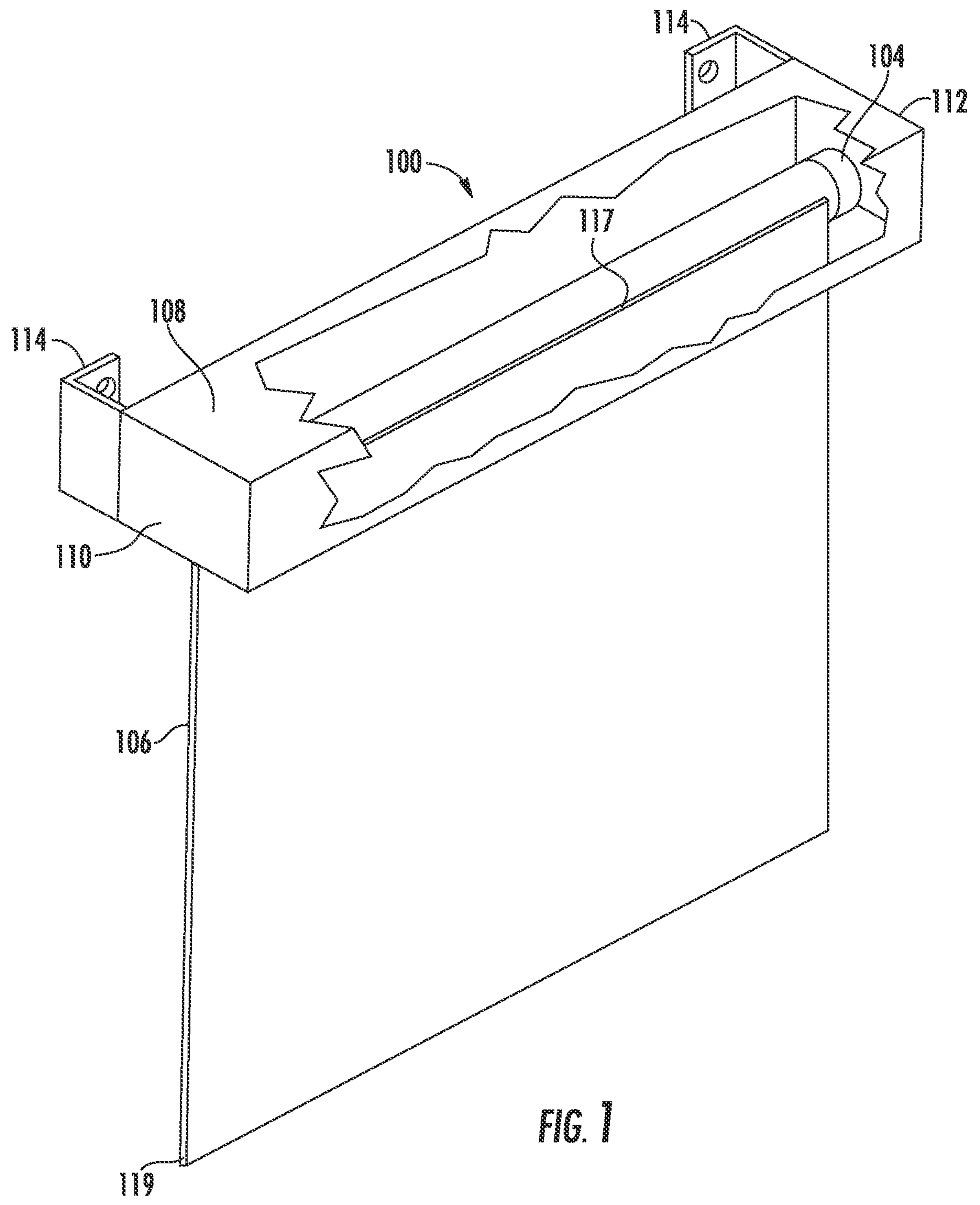
FIG. 1 is a perspective view illustrating an example of an embodiment of an architectural-structure covering including a covering shown in an extended position.

The drawings are not necessarily to scale. The drawings are merely representations, not intended to portray specific parameters of the disclosure. The drawings are intended to depict exemplary examples of embodiments of the disclosure, and therefore are not to be considered as limiting in scope. In the drawings, like numbering represents like elements.

DETAILED DESCRIPTION

Numerous examples of embodiments of a limit stop assembly in accordance with the present disclosure will now be described more fully hereinafter with reference to the accompanying drawings, in which preferred embodiments of the present disclosure are presented. In some examples of embodiments, the limit stop assembly engages or is coupled to (used interchangeably herein without the intent to limit) a rotatable member of an architectural-structure covering. The limit stop assembly of the present disclosure may, however, be embodied in many different forms and should not be construed as being limited to the embodiments set forth herein. Rather, these embodiments are provided so that this disclosure will convey certain example aspects of the limit stop assembly to those skilled in the art. In the drawings, like numbers refer to like elements throughout unless otherwise noted.

As will be described in greater detail below, in one example of an embodiment, the limit stop assembly of the present disclosure is used in connection with an architectural-structure covering, for example, a roller-type architectural-structure covering, as shown in FIG. 1. In use, the architectural-structure covering is used in relation to an architectural structure, which, without limitation, may be an opening such as a window, doorway, archway, a portion of a wall, or the like. It will be appreciated that references to an architectural opening/structure are made for convenience, and without intent to limit the present disclosure to a particular structure.

As will be described in greater detail below, the limit stop assembly may be used with any device now known or hereafter developed for regulating, controlling or limiting (used interchangeably herein without the intent to limit), for example, a limit stop position of the covering. In contrast with existing limit stop setting approaches, in which an installer must manually and iteratively establish travel stops (e.g., retraction and/or extension limit stops), the limit stop assembly of the present disclosure includes an automatic limiting approach. That is, in one example of an embodiment, the limit stop assembly and associated method according to the present disclosure automatically sets the travel limits of the covering, for example, the retraction limit of the covering, in particular the assembled covering, the first time the covering is retracted to a desired retraction limit. Alternatively, the limit stop assembly and associated method according to the present disclosure automatically sets the travel limits of the covering, for example, the extension limit of the covering, in particular the assembled covering, the first time the covering is extended to a desired extension limit. That is, in one example of an embodiment, the limit stop assembly is used to set a travel limit of the covering by initially moving the covering from a first position to a second position, such as, for example, a desired limit position of the covering for the second position, and then moving the covering back towards the first position so that future, continued operation of the architectural-structure covering is constrained by the desired limit as-set by initially moving the covering from the second position toward the first position. The travel limit is automatically set by moving the covering from a first position to a desired limit position of the covering for a second position and then moving the covering towards the first position. No further interaction (e.g., direct manipulation, such as manual adjustment of the limit stop) by the operator is required to set the travel limit.

For example, in one example of an embodiment, the limit stop assembly is used to set the retraction limit of the covering by initially retracting the covering from an extended position to a desired retraction limit so that future operation of the architectural-structure covering is constrained by the desired retraction limit as-set upon initial retraction and extension of the covering. Alternatively, for example, in one example of an embodiment, the limit stop assembly is used to set the extension limit of the covering by initially extending the covering from a retracted position to a desired extension limit so that future operation of the architectural-structure covering is constrained by the desired extension limit as-set upon initial extension and retraction of the covering. That is, in use, the limit stop assembly operates to set one or more of the travel limits of the covering relative to the rotatable member of the architectural-structure covering by moving the covering in a first direction and then moving the covering in the opposite direction. In use, the limit stop assembly operates to set, for example, the travel limit of the covering with limited or no further necessary adjustments. While the limit stop assembly will be described as being used to set the retraction limit of the covering, the limit stop assembly is likewise applicable for setting the travel limit for other directions of travel such as, for example, the extension direction of the covering. Thus, the limit stop assembly can be used to set either the extension limit or the retraction limit, as such, any statements about setting the retraction limit of the covering apply likewise to setting the extension limit, and vice-versa. Moreover, multiple limit stop assemblies could be used to set both the retraction and extension travel limits. Alternatively, the limit stop assembly could be used to set horizontal (e.g., left and/or right) travel limits for horizontally traveling architectural-structure coverings.

In one example of an embodiment, as will be described in greater detail herein, a limit stop assembly for use with an architectural-structure covering is disclosed. The architectural-structure covering includes or is associated with a central shaft, a rotatable member rotatable relative to the central shaft, and a covering coupled to the rotatable member and movable between a first position and a second position via rotation of the rotatable member. In one example of an embodiment, the central shaft is stationary (e.g., non-rotatable relative to the architectural-structure covering). In use, the limit stop assembly is movable between a first state of operation and a second state of operation, in the first state of operation the limit stop assembly is arranged and configured to enable the covering to be moved from the first position to the second position to set a travel limit of the covering, and in the second state of operation, the travel limit is set. The limit stop assembly is transitioned from the first state of operation to the second state of operation by moving the covering from a desired position for the travel limit for the second position towards the first position and transitioning the limit stop assembly from the first state of operation to the second state of operation sets the travel limit of the covering for the second position.

In another example of an embodiment, a method for automatically setting a travel limit of an architectural-structure covering movable between a first position and a second position is disclosed. The method includes providing a covering of the architectural-structure covering in the first position; moving the covering from the first position towards the second position; and upon reaching the second position, moving the covering towards the first position; wherein moving the covering from the second position to the first position automatically sets the travel limit of the covering at the second position.

In use, the limit stop assembly automatically sets a travel limit such as, for example, a retraction limit of the covering in the retracted position (e.g., the retraction limit of the covering is automatically set by the limit stop assembly by raising the covering to a desired position, and subsequently lowering the covering without a further specific limit-adjusting step or action). As previously mentioned, the limit stop assembly can also be used to automatically set the extension limit of the covering in the extended position (e.g., the extension limit of the covering is automatically set by the limit stop assembly by lowering the covering to a desired position, and subsequently raising the covering without a further specific limit-adjusting step or action). As a result, future, continued operation or movement of the covering between the extended and/or retracted positions is constrained by the travel limit. As previously mentioned, the limit stop assembly could be likewise used to set the extension limit of the covering in the extended position. In use, the limit stop assembly is selectively movable between a first state of operation and a second state of operation for purposes of setting the travel limit. In the first state of operation, for example, the limit stop assembly is arranged and configured to enable the covering to be moved from the extended position to the retracted position (or vice-versa) for purposes of setting the retraction limit of the covering. Once the desired retraction limit for the retracted position is reached, the covering is pulled or moved in the direction of the extended position causing the limit stop assembly to transition or change to the second state of operation thereby setting the retraction limit of the covering for future operation. For example, with the limit stop assembly in the first state of operation, the retraction limit of the covering can be set by retracting the covering from the extended position to a desired retraction limit position for the retracted position. Once the desired retraction limit position is reached, the covering can be pulled or moved toward the extended position, which causes the limit stop assembly to move from its first state of operation to its second state of operation, thereby setting the retraction limit of the covering during future, continued operation. Thus arranged, the limit stop assembly does not require direct interaction or manipulation by the user. Rather, the limit stop assembly initially sets the limit stop by manipulation of the covering (in contrast with direct manipulation of the limit stop assembly). In one example of an embodiment, the limit stop is set by moving the covering in the direction in which the limit stop is desired to be set until the covering reaches the desired limit stop, then the covering is moved in the opposite direction to set the limit stop. In one example of an embodiment, it is envisioned that the travel limit is set by the manufacturer in the factory.

In one example of an embodiment, the limit stop assembly includes an assembly for setting a travel limit such as, for example, a retraction limit of the covering in the retracted position, although as previously mentioned, the limit stop assembly can also be used to set the extension limit of the covering in the extended position. In one example of an embodiment, the assembly includes a first state of operation and a second state of operation. The first state of operation is arranged and configured to enable the covering to be moved from the extended position to the retracted position for purposes of setting the retraction limit of the covering. Once the desired retraction limit for the retracted position is reached, the covering is pulled or moved in the direction of the extended position causing the limit stop assembly to move to the second state of operation thereby setting the retraction limit of the covering for future, continued operation. That is, in the first state of operation, the covering is freely retracted to a desired position. Once the desired position is reached, the covering can be moved toward the extended position, which transitions the limit stop assembly to the second state of operation and thus sets the retraction limit of the retracted position of the covering. Thereafter, with the limit stop assembly in the second state of operation, the covering is movable between the extended and retracted positions, as defined by the retraction limit of the retracted position.

In accordance with a disclosed method of setting a limit stop, the limit stop is set by moving the covering in the direction in which the limit stop is desired to be set until the covering reaches the desired limit stop, then the covering is moved in the opposite direction to set the limit stop. For example, in one example of an embodiment, setting the travel limit stop (e.g., retraction limit stop) is achieved by positioning the architectural-structure covering in an extended position, and then moving the covering from its extended position to the desired limit for the retracted position. In use, in one example of an embodiment, the architectural-structure covering includes or is associated with a limit nut that is rotated by, for example, movement (e.g., extension and/or retraction) of the covering. The limit nut is freely rotated as needed to set the desired limit for the extended and/or retracted positions of the covering. That is, in one example of an embodiment, the limit nut is associated with the architectural-structure covering so that movement of the covering between the extended and retracted positions causes the limit nut to rotate. For example, in one example of an embodiment, the limit nut engages the rotatable member of the architectural-structure covering so that upon extension or retraction of the covering, such as, for example, via rotation of the rotatable member, the limit nut rotates. Once the covering is in the desired position (e.g., at the desired travel limit, for example, retraction travel limit), the covering is moved in the opposite direction, causing the limit nut to automatically (e.g., without direct or further active interaction by the operator to set the travel limit) set a stop in place to set the limit of travel of the limit nut to set the limit stop.

In one example of an embodiment, the limit stop assembly is positioned within a rotatable member (e.g., a roller for an architectural-structure covering). The limit stop assembly includes a threaded screw shaft. In use, the limit nut and the threaded screw shaft are rotatable relative to each other. For example, in one example of an embodiment, the limit nut engages the threaded screw shaft so that rotation of the rotatable member rotates the limit nut relative to the screw shaft (e.g., the limit nut engages the rotatable member to rotate with the rotatable member).

In one example of an embodiment, the screw shaft is in selective contact with an axially-translatable collar. In use, the collar translates axially between a first collar position and a second collar position. In the first collar position, the limit stop assembly is in the first state of operation so that the covering is movable from a first position such as, for example, an extended position, to a second position such as, for example, a retracted position, to set a travel limit of the covering. In the second collar position, the limit stop assembly is in the second state of operation so that the travel limit is set and future, continued movement of the covering is constrained by the travel limit (e.g., movement of the covering in the direction of the set limit is constrained by the limit nut contacting a fixed stop (e.g., a physical object such as, for example, a shaft limit stop)). In the first collar position, the collar engages an end of the screw shaft to rotate with the screw shaft, and relative to the architectural structure to which the architectural-structure covering is mounted, such as, for example, by rotating with the rotating member relative to a central shaft. In the second collar position, the collar engages the screw shaft in a manner that prevents rotation of the collar relative to the screw shaft, thus constraining or limiting rotation of the limit nut in the direction of the set limit. The first collar position may be considered a "cocked position" if the collar is normally biased out of this position.

With the limit stop assembly in the first state of operation and the collar in the first collar position, when the rotatable member (e.g., roller) of the architectural-structure covering is rotated to set the travel limit (e.g., retraction limit, extension limit) of the covering, the limit nut rotates relative to the screw shaft and eventually contacts the collar and a shaft limit stop positioned on the screw shaft, at which point the screw shaft rotates with the limit nut (as well as the collar). In the first collar position or "cocked" position, rotation of the limit nut causes the screw shaft and the collar to rotate so the covering can continue to extend/retract to the desired position. In one example of an embodiment, continued rotation of the limit nut after contacting the shaft limit stop causes the screw shaft to rotate relative to a hub mounted on the central shaft and in contact with the screw shaft at an end thereof. Rotation of the screw shaft relative to the hub allows the limit nut to continue rotating and thus allows the rotatable member to continue rotating until the covering is in the desired position.

Once the covering is in the desired position, the covering is moved in the opposite direction, causing the limit nut to rotate in the opposite direction as well. By rotating the limit nut in the opposite direction, the limit nut transitions or moves the collar into the second collar position. In the second collar position or "uncocked" position, the collar axially translates so as to engage both the screw shaft and the hub thereby rotationally locking both of these parts together and thus preventing them from rotating (such as rotationally fixing them relative to the central shaft). As a result of preventing the screw shaft from rotating, the travel limit for the limit nut and the screw shaft is set for future, continued movement of the covering.

In one example of an embodiment, the limit stop assembly includes a screw shaft, a limit nut, a hub, and a collar. During use, the screw shaft and the hub are mounted on a non-rotatable central shaft associated with an architectural-structure covering. The hub is non-rotatably mounted on the central shaft so that relative rotation between the hub and the central shaft is inhibited or prevented. The hub is in contact with a first end of the screw shaft so that rotation of the screw shaft relative to the hub is permitted. The limit nut is threadably received on the screw shaft. The limit nut is adapted and configured for engaging the rotatable member of the architectural-structure covering so that rotation of the rotatable member rotates the limit nut with respect to the screw shaft. The collar is selectively movable between a first collar position and a second collar position. In the first collar position, the collar is rotatably coupled to the first end of the screw shaft so that the screw shaft and collar rotate together. With the collar in the first collar position, the limit stop assembly is in the first state of operation. In the second collar position, the collar is coupled to the screw shaft and the hub so that the collar, screw shaft, and hub are prevented from, inter alia, rotating with respect to the central shaft. With the collar in the second collar position, the limit stop assembly is in the second state of operation.

In another example of an embodiment, the limit stop assembly includes a screw shaft, a locknut, a limit nut, a hub, and a collar. During use, the screw shaft is mounted on a non-rotatable central shaft associated with an architectural-structure covering. The locknut and the collar are rotatably mounted on the screw shaft so that the locknut and the collar can rotate relative to the screw shaft. The hub is in contact with the locknut so that rotation of the locknut relative to the hub is permitted and so that the hub is axially translatable relative to the screw shaft. The limit nut is threadably received on the screw shaft. The limit nut is adapted and configured for engaging the rotatable member of the architectural-structure covering so that rotation of the rotatable member rotates the limit nut with respect to the screw shaft. The collar is selectively movable between a first collar position and a second collar position. In the first collar position, the collar is rotatably coupled to the screw shaft so that the collar can rotate relative to the screw shaft. In addition, the collar engages the locknut but the collar is disengaged from the hub so that rotation of the locknut relative to the hub is permitted. With the collar in the first collar position, the limit stop assembly is in the first state of operation. In the second collar position, the collar disengages the locknut so that the collar is coupled to the locknut and the hub so that the collar, the locknut, and the hub are prevented from, inter alia, rotating with respect to the screw shaft (e.g., rotation of the locknut relative to the hub is prevented). With the collar in the second collar position, the limit stop assembly is in the second state of operation.

It should be understood that, as described herein, an "embodiment" (such as illustrated in the accompanying Figures) may refer to an illustrative representation of an environment or article or component in which a disclosed concept or feature may be provided or embodied, or to the representation of a manner in which just the concept or feature may be provided or embodied. However, such illustrated embodiments are to be understood as examples (unless otherwise stated), and other manners of embodying the described concepts or features, such as may be understood by one of ordinary skill in the art upon learning the concepts or features from the present disclosure, are within the scope of the disclosure. In addition, it will be appreciated that while the Figures may show one or more embodiments of concepts or features together in a single embodiment of an environment, article, or component incorporating such concepts or features, such concepts or features are to be understood (unless otherwise specified) as independent of and separate from one another and are shown together for the sake of convenience and without intent to limit to being present or used together. For instance, features illustrated or described as part of one embodiment can be used separately, or with another embodiment to yield a still further embodiment. Thus, it is intended that the present subject matter covers such modifications and variations as come within the scope of the appended claims and their equivalents.

FIG. 1 shows an example of an embodiment of an architectural-structure covering 100 that incorporates a limit stop assembly according to the present disclosure. The architectural-structure covering 100 may include a covering 106 movable between a retracted position and an extended position (illustratively, the position shown in FIG. 1). As illustrated, the covering 106 may be a unitary sheet of flexible material having an upper edge 117 coupled to a rotatable member 104 and a lower, free edge 119. However, it will be appreciated that other covering types are within the scope of the present disclosure. In one example of an embodiment, when in the retracted position, the covering 106 is wound about the rotatable member 104, although other manners of retracting architectural-structure coverings are envisioned. Although not shown, a drive mechanism can be provided to move the covering 106 between the extended and retracted positions. The drive mechanism can take any appropriate form (e.g., a clutch, a gear, a motor, a drive train, and/or a gear train, etc.) and can include any type of controls (e.g., continuous loop, raise/lower cord(s), chains, ropes, a motor, etc.).

As illustrated, the architectural-structure covering 100 may also include a headrail 108, which in the illustrated example of an embodiment is a housing having opposed end caps 110, 112 joined by front, back, and top sides to form an open bottom enclosure. The headrail 108 may also include mounts 114 for coupling the headrail 108 to a structure above, or at the top of, an architectural opening, such as a wall, via mechanical fasteners such as screws, bolts, or the like. The rotatable member 104 may be rotatably coupled between the end caps 110, 112. Although a particular example of a headrail 108 is shown in FIG. 1, many different types and styles of headrails exist and could be employed in place of the example headrail of FIG. 1.

Referring to FIG. 1, for the sake of convenience and clarity, terms such as "front," "rear," "top," "bottom," "up," "down," "vertical," "horizontal", "inner," and "outer" may be used herein to describe the relative placement and orientation of various components and portions of the architectural-structure covering 100, each with respect to the geometry and orientation of the architectural-structure covering 100 as they appear in FIG. 1. Said terminology is intended to be non-limiting and is used herein merely to describe relationship between various components as illustrated in FIG. 1.

Figure 2:
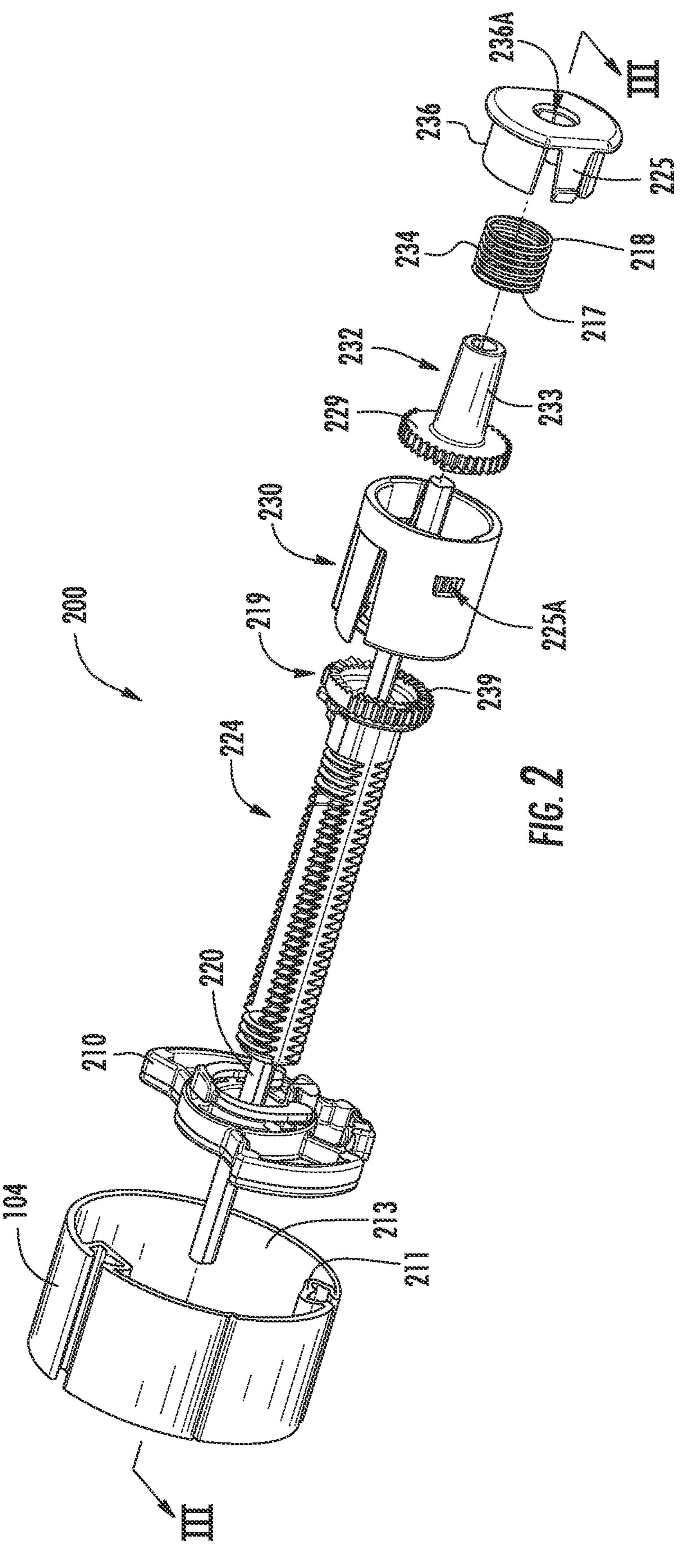
FIG. 2 is an exploded, perspective view illustrating an example of an embodiment of a limit stop assembly in accordance with an illustrative example of an embodiment of the present disclosure.
Figure 3:
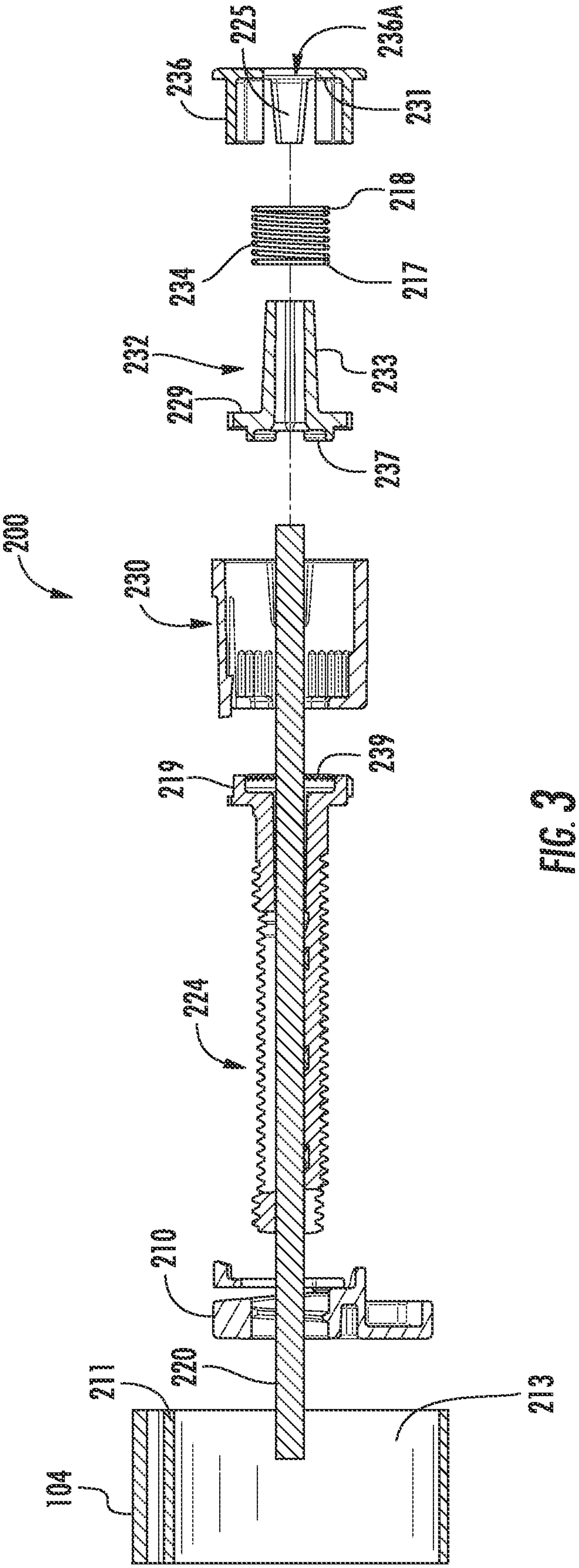
FIG. 3 is an exploded, cross-sectional view illustrating the limit stop assembly shown in FIG. 2, taken along line III-III of FIG. 2.

Referring now to FIGS. 2 and 3, a limit stop assembly 200 according to an example of an embodiment of the present disclosure will now be described. In use, the limit stop assembly 200 may be, for example, coupled to, and/or located within, the rotatable member 104 for regulating the deployment of the covering 106. The rotatable member 104 is associated with or mounted to a central shaft 220 so that, in use, the rotatable member 104 is rotatable relative to the central shaft 220. In one example of an embodiment, the central shaft 220 is a stationary, non-rotatable central shaft such as, for example, a V-rod to which the limit stop assembly 200 is mounted or coupled. The central shaft 220 is mounted on or coupled to, for example, the endcaps 110, 112 of the architectural-structure covering 100. In use, the central shaft 220 remains stationary (e.g., the central shaft 220 does not rotate relative to the architectural-structure covering) and is used, for example, to mount the limit stop assembly 200 within the rotatable member 104.

In use, the limit stop assembly 200 is adapted and configured for engaging the rotatable member 104 so that rotation of the rotatable member 104 rotates at least a portion or a component of the limit stop assembly 200. Thus, initially, operation of the covering 106 causes setting of a limit stop for the covering 106. In this manner, in one example of an embodiment, with the limit stop assembly 200 in the first state of operation and with the covering 106 in the extended position, the covering 106 is raised to a desired retraction limit for the covering 106 when in the retracted position. Once the desired retraction limit is reached, the covering 106 is moved towards the extended position, which, in turn, transitions the limit stop assembly 200 from the first state of operation to the second state of operation. In the second state of operation, the limit stop assembly 200 sets a position of a limit stop so that future, continued operation of the covering 106 is constrained by the position of the stop.

In one example of an embodiment, the limit stop assembly 200 includes a limit nut 210, a screw shaft 224, a collar 230, and a hub 232. During use, the screw shaft 224 is rotatably received on the central shaft 220. The screw shaft 224 is selectively permitted to rotate with respect to the central shaft 220. The limit nut 210 is rotatably received on the screw shaft 224. In addition, the limit nut 210 is operatively coupled to the rotatable member 104 of the architectural-structure covering 100 so that rotation of the rotatable member 104 by raising/retracting or lowering/extending of the covering 106, causes the limit nut 210 to rotate about and along a longitudinal axis of the screw shaft 224. In one example of an embodiment, the hub 232 is restricted from rotating with respect to the central shaft 220. However, the hub 232 is axially movable with respect to the central shaft 220, for example along a longitudinal direction of the central shaft 220. For example, in one example of an embodiment, the hub 232 is keyed to the central shaft 220, for example, the hub 232 includes a projection 295 (FIG. 19) for mating with a slot or groove 215 (FIG. 5) formed in an outer surface of the central shaft 220, although it is envisioned that other arrangements for keying the hub 232 to the central shaft 220 may be used.

In use, the collar 230 is movable between first and second collar positions. In the first collar position (as shown, for example, in FIGS. 4, 6, 7, and 8), the collar 230 engages the screw shaft 224, and the hub 232 is in contact with the screw shaft 224 (e.g., as will be described, axially extending hub splines 237 located on an end of the hub 232 engage corresponding axially extending screw shaft splines 239 located on an end 219 of the screw shaft 224). In the first collar position, the collar 230 and screw shaft 224 are arranged and configured to rotate together. Meanwhile, in the first collar position, the hub 232 and the screw shaft 224 are arranged and configured so that rotation of the screw shaft 224 relative to the hub 232 is possible. With respect to the screw shaft 224, as described in greater detail herein, the screw shaft 224 is initially inhibited from moving relative to the hub 232 but relative movement between the screw shaft 224 and hub 232 is possible once the engagement force between the hub 232 and screw shaft 224 is overridden (e.g., exceeded). In the second collar position (as shown, for example, in FIG. 9), the collar 230 is engaged with the screw shaft 224 and the hub 232, and as a result of the hub 232 being non-rotatably mounted onto the central shaft 220, the collar 230, the screw shaft 224, the hub 232, and the central shaft 220 are prevented from relative rotation with respect to one another.

In the first collar position, the contact between the hub 232 and the screw shaft 224 initially inhibits the screw shaft 224 from rotating with respect to the hub 232 and the central shaft 220, and thus rotation of the rotatable member 104 causes the limit nut 210 to rotate with respect to the screw shaft 224 and thus translate along a length of the screw shaft 224. However, as will be described in greater detail below, in the first collar position, continued rotation of the limit nut 210 after a stop or projection (e.g., a limit nut stop 256) formed on the limit nut 210 contacts a corresponding stop or projection (e.g., a shaft limit stop 257) formed on the screw shaft 224 causes the screw shaft 224 to rotate relative to the hub 232. That is, in the first collar position, initially (e.g., prior to the stop or projection (e.g., a limit nut stop 256) formed on the limit nut 210 contacting the stop or projection (e.g., a shaft limit stop 257) formed on the screw shaft 224), engagement between the hub 232 and the screw shaft 224 inhibits the screw shaft 224 from rotating with respect to the hub 232. However, continued rotation of the limit nut 210 after the stop or projection (e.g., a limit nut stop 256) formed on the limit nut 210 contacts the stop or projection (e.g., a shaft limit stop 257) formed on the screw shaft 224 causes the screw shaft 224 to override the engagement with the hub 232 and thus enable the screw shaft 224 to rotate relative to the hub 232 and the central shaft 220 to allow for further rotation of the rotatable member 104 to allow the covering 106 to move to its desired limit position.

Figure 18:
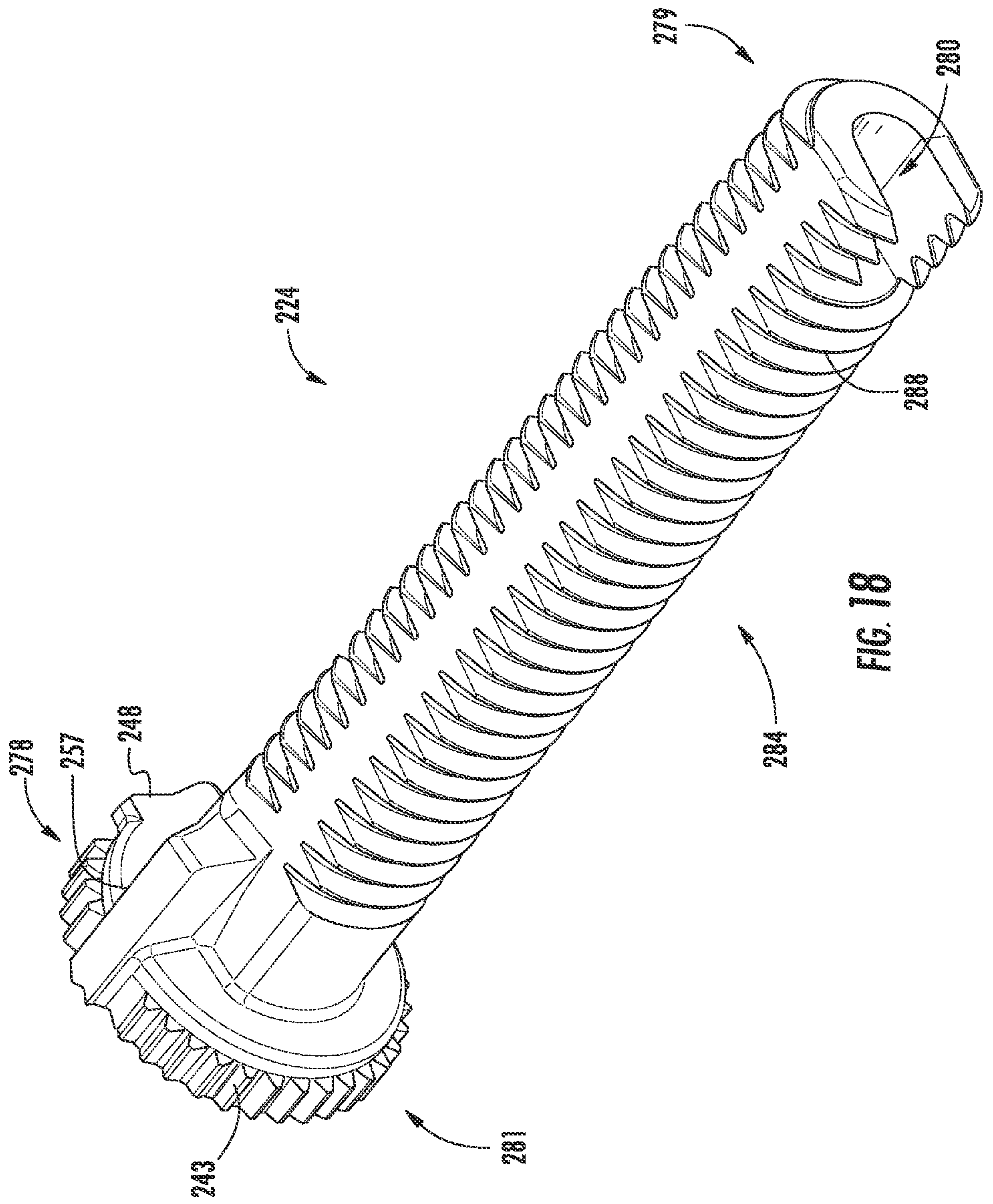
FIG. 18 is an alternate end perspective view of the screw shaft of FIG. 16.

In one example of an embodiment, the limit nut 210 may include a limit nut stop 256 (FIGS. 8, 10, 11, 12, and 13) and the screw shaft 224 may include a shaft limit stop 257 (FIG. 18). In use, rotation of the limit nut 210 relative to the screw shaft 224 causes the limit nut stop 256 to contact the shaft limit stop 257. Thereafter, continued rotation of the limit stop assembly 200 caused by, for example, continued rotation of the rotatable member 104 after the limit nut stop 256 formed on the limit nut 210 contacts shaft limit stop 257 formed on the screw shaft 224 causes the screw shaft 224 to rotate relative to the hub 232, and hence with respect to the central shaft 220. That is, in the first collar position, continued rotation of the rotatable member 104 after the limit nut stop 256 formed on the limit nut 210 contacts the shaft limit stop 257 formed on the screw shaft 224 overcomes the engaging force between the hub 232 and the screw shaft 224 so that the screw shaft 224 rotates relative to the hub 232, which remains rotationally stationary on the central shaft 220.

Once the desired position of the covering 106 is achieved, the covering 106 is moved in the opposite direction causing the collar 230 to move into the second collar position. In the second collar position (shown in FIG. 9), the collar 230 engages both the screw shaft 224 and the hub 232, thus preventing rotation of the screw shaft 224 relative to the hub 232 and relative to the central shaft 220, and thus setting the travel limit of the covering 106, for future, continued operation. With the collar 230 in the first collar position, the limit stop assembly 200 is in the first state of operation, and with the collar 230 in the second collar position, the limit stop assembly 200 is in the second state of operation.

As shown in FIGS. 2 and 3, in accordance with a non-limiting example of an embodiment, the limit stop assembly 200 may include an optional biasing member such as, for example, a spring 234 to bias the hub 232 into contact with the screw shaft 224. That is, the biasing member (e.g., spring) 234 may axially bias the hub 232 towards the screw shaft 224 so that the hub 232 and the screw shaft 224 are biased into engagement with each other (such as to limit rotation therebetween). In addition, the biasing member (e.g., spring) 234 may act to bias the collar 230 towards the second collar position when the collar 230 disengages the screw shaft 224, as will be described in greater detail below. In one example of an embodiment, the biasing member (e.g., spring) 234 may be operatively held in position by a spring retainer 236. In some examples of embodiments, as assembled, the spring 234 is a helical spring including a first end 217 for contacting the hub 232, for example, the first end 217 of the spring 234 contacts a portion or a wall 229 of the hub 232. The spring 234 also has a second end 218, the second end 218 contacts the spring retainer 236, for example, the second end 218 contacts a portion or a surface of an end wall 231 of the spring retainer 236. The spring retainer 236 includes one or more projections 225 for engaging a corresponding borehole 225A formed in the collar 230 so that the spring retainer 236 is coupled to the collar 230. In some examples of embodiments, the spring 234 extends around a stem 233 of the hub 232. In use, the spring retainer 236 includes a corresponding borehole 236A for receiving a portion of the stem 233 of the hub 232. In use, the spring retainer 236 and the spring 234 are slidably positioned along the length of the stem 233. In addition, the hub 232, the spring 234, and the spring retainer 236 are located in, or at least partially located within, an inner cavity of the collar 230. As arranged and configured, the spring 234 axially biases the hub 232 towards the screw shaft 224 when the collar 230 is in the first collar position. That is, as will be described in greater detail below, the spring 234 axially biases the hub 232 so that hub splines 237 (e.g., axially extending hub splines) located on an end of the hub 232 engage corresponding screw shaft splines 239 (e.g., axially extending screw shaft splines) located on an end 219 of the screw shaft 224.

As previously mentioned, the hub 232 initially engages the screw shaft 224 so as to inhibit relative rotation therebetween. Referring to FIGS. 3, 4, 6, and 9, in one example of an embodiment, the hub 232 may include a plurality of hub splines 237 (e.g., axially extending hub splines—splines extend axially from an end of the hub 232 (in contrast to circumferential or outwardly extending ridges)) and the screw shaft 224 may include a plurality of shaft splines 239 (e.g., axially extending shaft splines—splines extend axially from an end of the screw shaft 224 (in contrast to circumferential or outwardly extending ridges)). In use, the hub 232 is moved into engagement with the screw shaft 224 (e.g., the hub splines 237 are moved into engagement with the shaft splines 239) by the biasing force of the spring 234. The hub splines 237 and the shaft splines 239 are arranged and configured so that, when the collar 230 is in the first collar position, relative rotation between the screw shaft 224 and the hub 232 is possible. That is, in the first collar position, the rotational coupling of the screw shaft 224 and the hub 232 via the hub splines 237 and the screw shaft splines 239 may be overcome by, for example, continued rotation of the rotatable member 104 after the limit nut 210 contacts the screw shaft 224 causing the screw shaft 224 to rotate relative to the hub 232 to allow for further rotation of the rotatable member 104 to allow the covering 106 to move to its desired limit position (e.g., hub 232 moves away from the screw shaft 224 against the biasing force of the spring 234).

Figure 4:
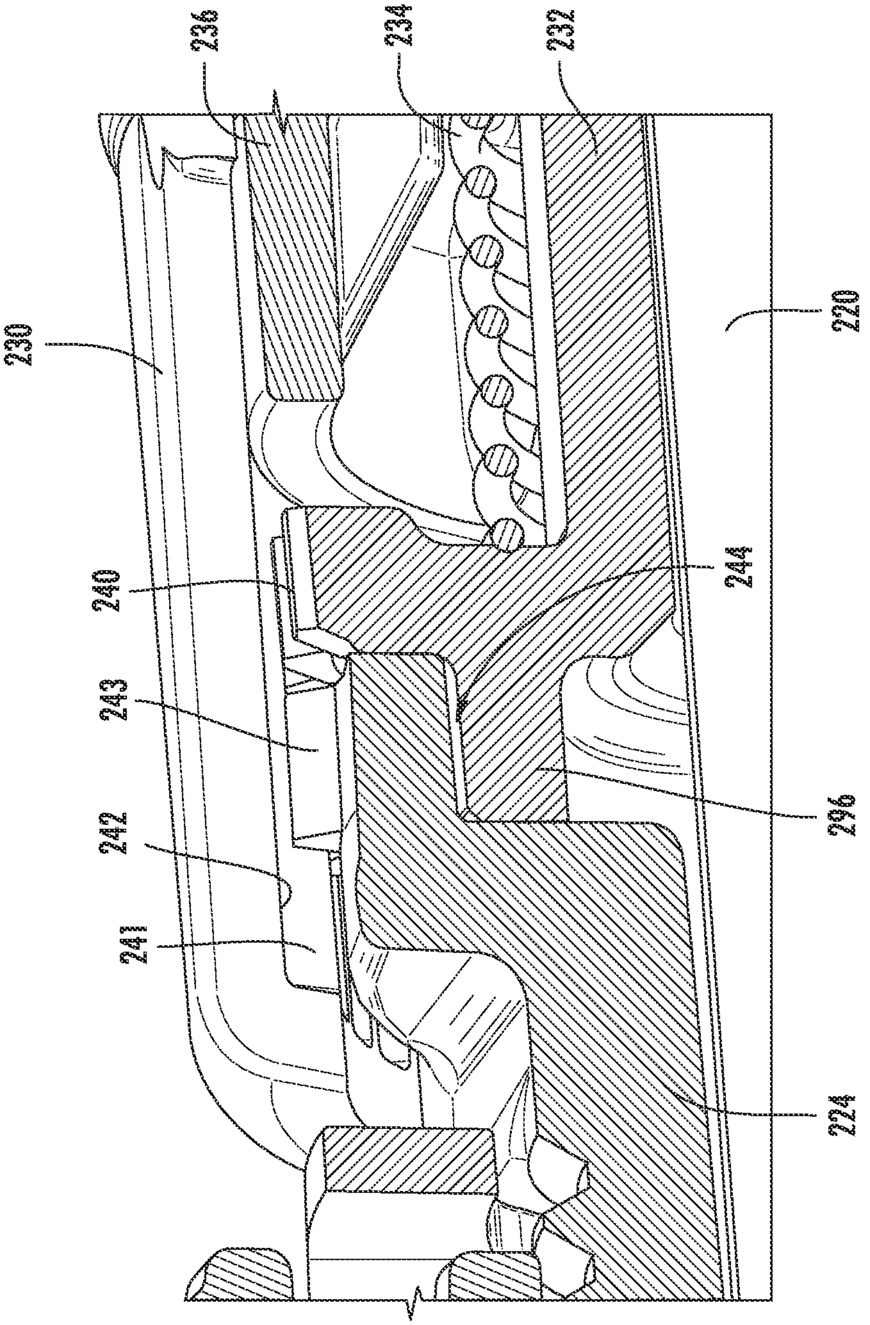
FIG. 4 is a, detailed, cross-sectional view illustrating a portion of the limit stop assembly shown in FIG. 2, the limit stop assembly illustrated in the first state of operation.
Figure 5:
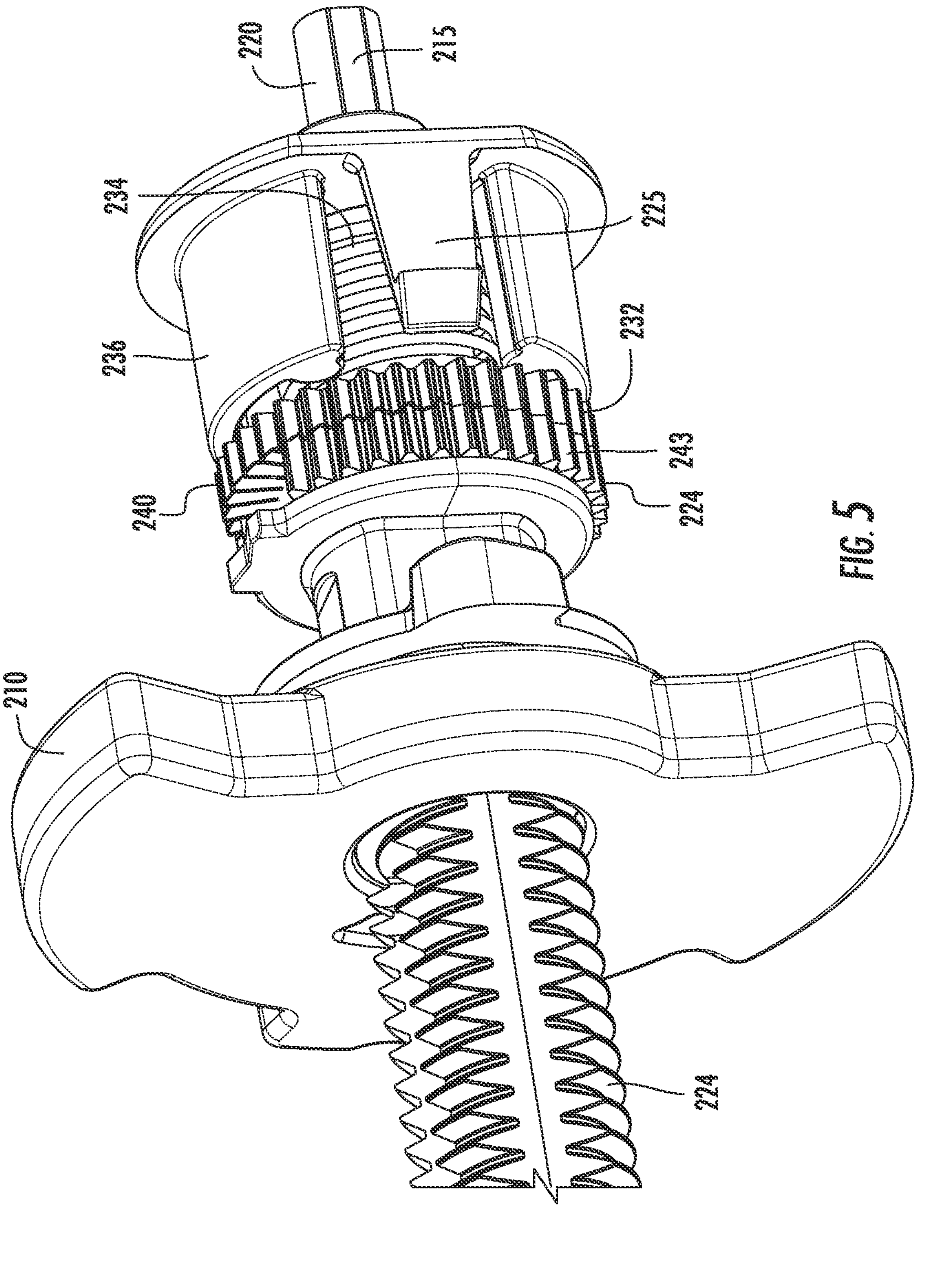
FIG. 5 is an alternate, partial perspective view illustrating the limit stop assembly shown in FIG. 2 with the collar removed for clarity.

Referring now to FIGS. 4 and 5, in one example of an embodiment, the screw shaft 224 includes teeth or shaft ridges 243 on an outer circumference thereof for interacting with inwardly directed collar ridges 241 formed on an inner surface 242 of the collar 230. The hub 232 also includes outwardly directed teeth or hub ridges 240 along an outer circumference thereof for interacting with the collar ridges 241 on the inner surface 242 of the collar 230. As will be described in greater detail below, in the illustrated example of an embodiment, the collar ridges 241 formed on the inner surface 242 of the collar 230 interact with the screw shaft ridges 243 when in the first collar position (e.g., when the limit stop assembly 200 is in the first state of operation with the collar 230 in the first collar position). In the first collar position, the collar ridges 241 and the hub ridges 240 are axially displaced with respect to each other. Thereafter, when the collar 230 is transitioned to the second collar position, the collar ridges 241 interact with the screw shaft ridges 243 formed on the screw shaft 224 and with the hub ridges 240 formed on the hub 232 (e.g., when the limit stop assembly 200 is in the second state of operation with the collar 230 in the second collar position) to prevent the screw shaft 224 from rotating with respect to the hub 232. That is, as will be described in greater detail below, in the first collar position (shown in FIGS. 4 and 6), the collar ridges 241 formed on the inner surface 242 of the collar 230 engages the screw shaft ridges 243 formed on the outer circumference of the screw shaft 224. However, the collar ridges 241 formed on the inner surface 242 of the collar 230 do not engage the hub ridges 240 disposed along the outer circumference of the hub 232. In this manner, in the first collar position, the hub 232 and the screw shaft 224 are arranged and configured so that rotation of the screw shaft 224 relative to the hub 232 is permitted. In the second collar position (shown in FIG. 9), the collar 230 is engaged with the screw shaft 224 and the hub 232, and as a result of the hub 232 being non-rotatably mounted onto the central shaft 220, the collar 230, the screw shaft 224, the hub 232, and the central shaft 220 are prevented from relative rotation with respect to one another.

Referring to the example of an embodiment of FIG. 5, when coupled together, the hub ridges 240 formed on the illustrated hub 232 and the screw shaft ridges 243 formed on the illustrated screw shaft 224 are positioned side-by-side (e.g., axially and radially aligned). That is, in some examples of embodiments, the screw shaft ridges 243 disposed on the outer circumference of the screw shaft 224 and the hub ridges 240 disposed on the outer circumference of the hub 232 are configured to be adjacent and aligned with one another when the hub splines 237 of the hub 232 contact the screw shaft splines 239 of the screw shaft 224.

Figure 6:
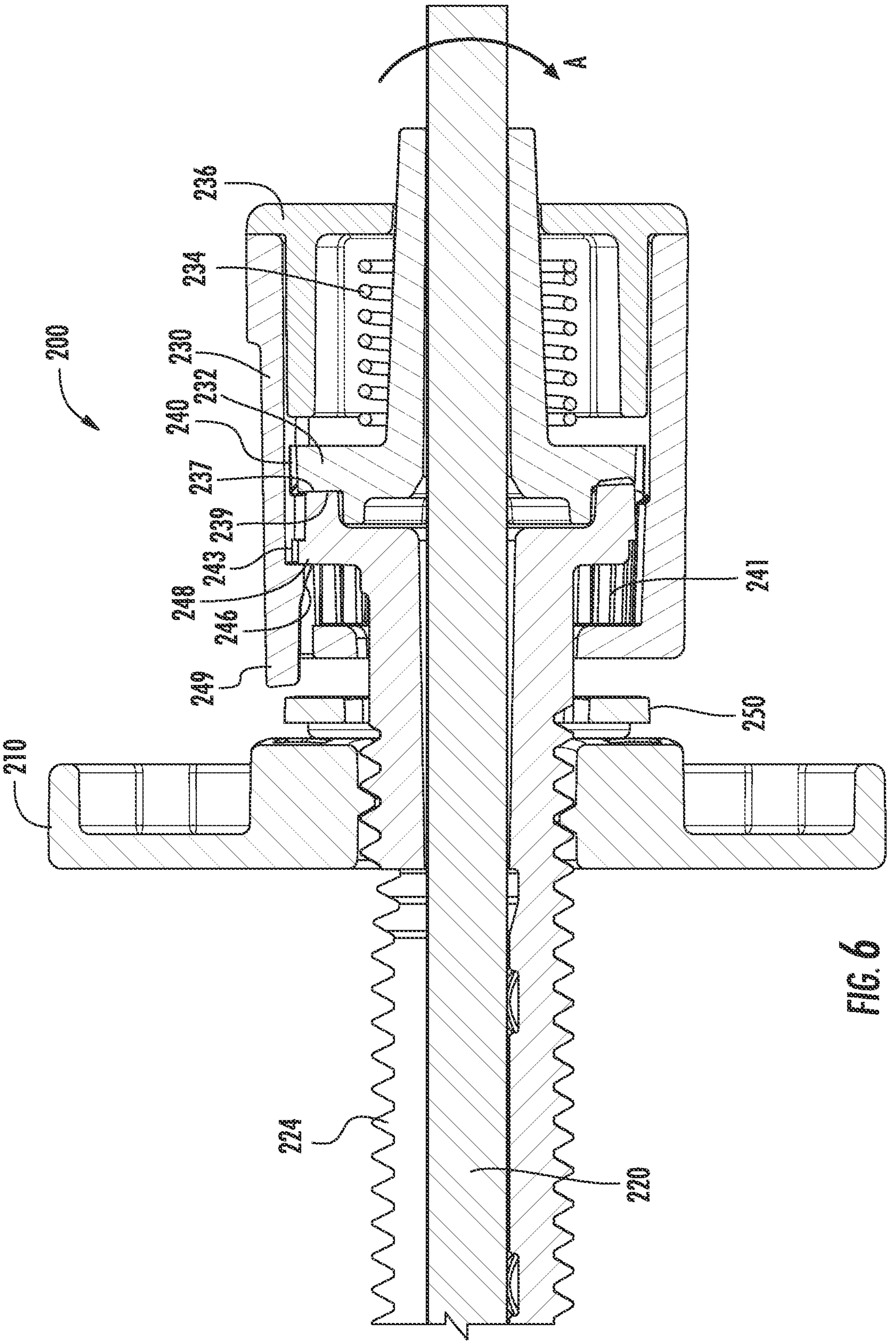
FIG. 6 is an alternate cross-sectional view illustrating the limit stop assembly shown in FIG. 2, the limit stop assembly illustrated in the first state of operation.
Figure 7:
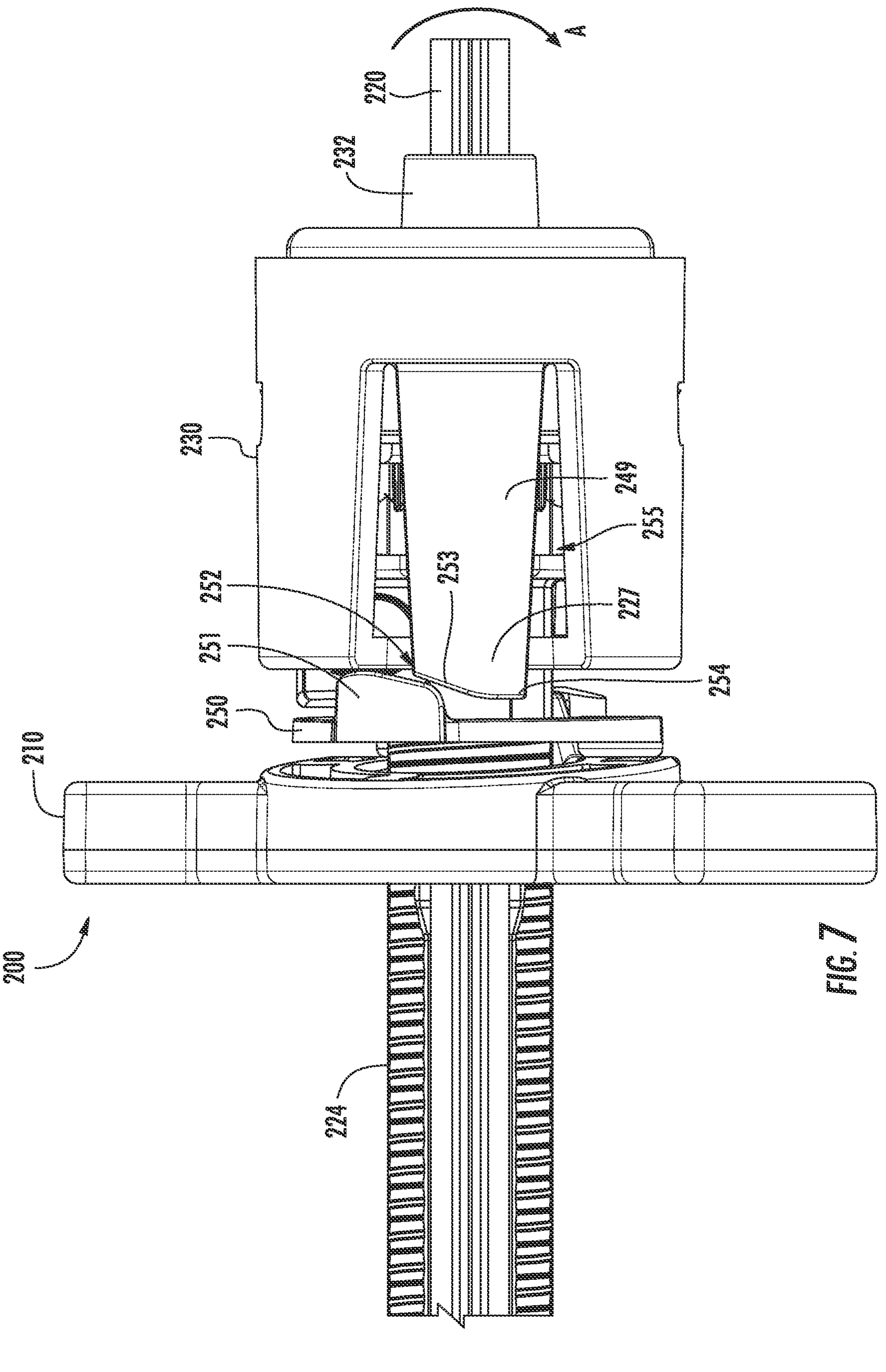
FIG. 7 is a side perspective view illustrating operation of an actuator of the limit stop assembly shown in FIG. 2.
Figure 8:
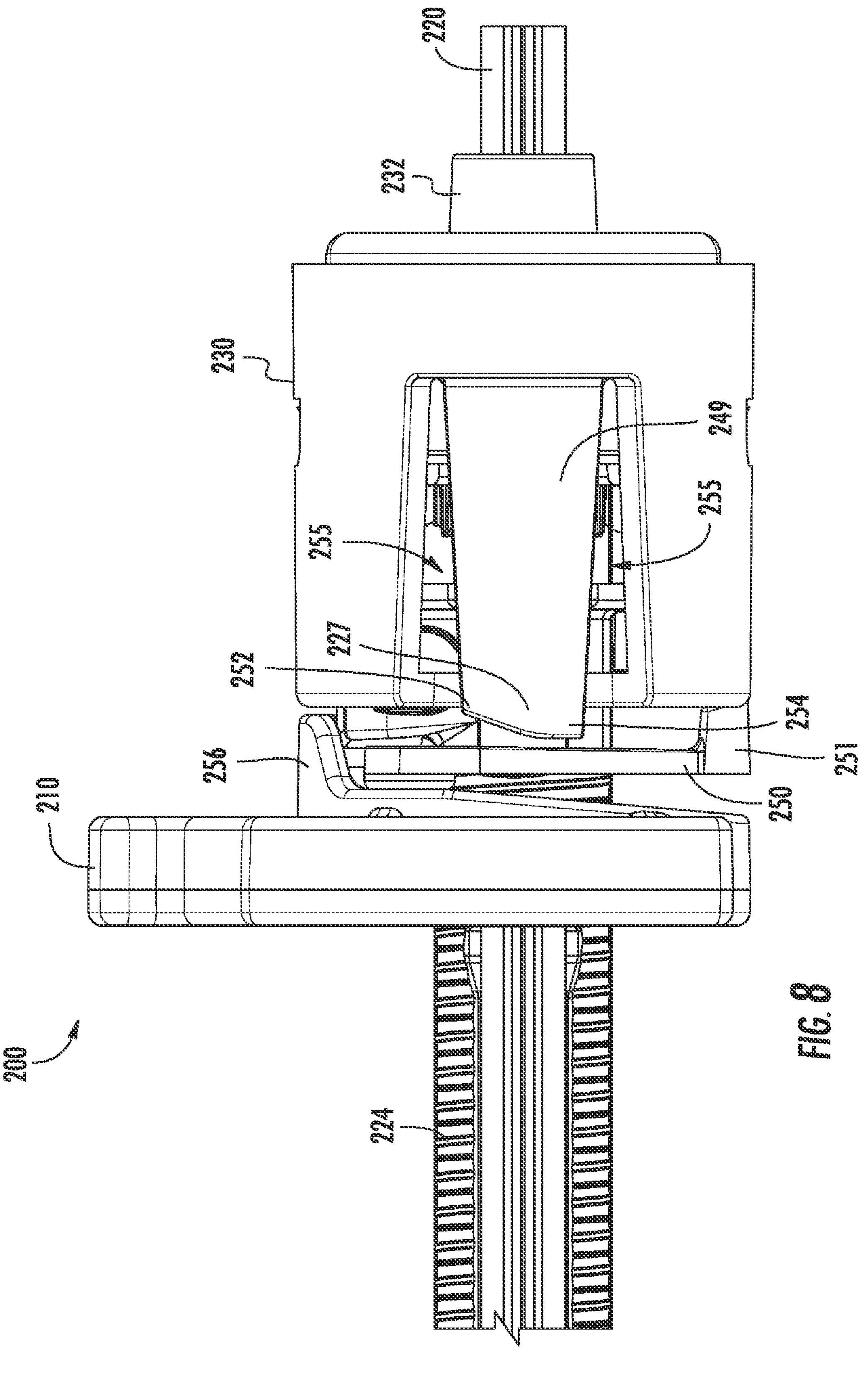
FIG. 8 is a side perspective view illustrating operation of the actuator of the limit stop assembly shown in FIG. 7.

Turning now to FIGS. 6-8, in the first collar position, the collar 230 may be coupled to the screw shaft 224 by any mechanism now known or hereafter developed. That is, in use, the collar 230 may be arranged and configured so that it is in contact (e.g., coupled) with the screw shaft 224 so that the collar 230 is maintained in the first collar position against the biasing force of, for example, the spring 234. For example, in one example of an embodiment, the collar 230 includes a tab 249 having a projection 246 disposed at a free end thereof. As illustrated, the tab 249 is formed in the outer circumference of the collar 230. As such, the tab 249 is axially extending while the projection 246 extends inwardly towards the screw shaft 224. In this manner, in the first collar position, the projection 246 contacts a corresponding projection or abutment surface 248 of the screw shaft 224. For example, the projection 246 and the abutment surface 248 include complimentary abutting surfaces operable to prevent axial movement of the collar 230 away from the screw shaft 224 along the longitudinal axis of the central shaft 220. As such, in the first collar position, the collar 230 is maintained in the first collar position via, for example, the coupling between the projection 246 and the abutment surface 248.

With continued reference to FIGS. 6-9, an example method of operation with now be described. During use, with the limit stop assembly 200 initially in the first state of operation (e.g., with the collar 230 in the first collar position), rotation of the rotatable member 104 by initially moving the covering 106 causes the rotatable member 104 to rotate, which in turn rotates the limit nut 210 and causes the limit nut 210 to axially translate or move about the screw shaft 224 along the longitudinal axis of the central shaft 220 (e.g., to the right in the orientation shown). As will be described in greater detail below, in one example of an embodiment, the limit nut 210 includes an actuator 250, such as a leaf spring, press-fitted thereto. Rotation of the limit nut 210 caused by moving the covering 106 rotates the actuator 250 about the screw shaft 224 and the central shaft 220, for example, in a first rotational direction shown as arrow 'A.' Referring to FIGS. 7 and 8, as the actuator 250 continues to rotate, an actuator tab 251 of the actuator 250 is brought into position proximate the tab 249 of the collar 230. However, referring to FIGS. 7 and 8, and as will be described in greater detail below, with the collar 230 in the first collar position, the actuator 250 moves or slides past the collar 230, for example, the tab 249 formed on the collar 230, without altering the position of the collar 230.

As the actuator 250 continues to rotate about the screw shaft 224 in direction A as shown in FIG. 7, the actuator tab 251 passes a trailing edge 254 of the tab 249, and moves into the position shown in FIG. 8. At this point, continued rotation of the rotatable member 104 causes a limit nut stop 256 positioned on the limit nut 210 to contact a complementary shaft limit stop 257 positioned on the screw shaft 224 (FIG. 8). Due to the contact between the limit nut stop 256 and the shaft limit stop 257, continued rotation of the rotatable member 104 in direction A as shown in FIG. 7, causes the limit nut 210 and the screw shaft 224 to rotate together. That is, continued rotation of the rotatable member 104 in direction A as shown in FIG. 7, overcomes the engaging force between the hub splines 237 and the screw shaft splines 239 (FIGS. 5 and 6) so that the screw shaft 224 is rotatable relative to the hub 232. In this manner, the covering 106 continues to be moved from, for example, the extended position towards the retracted position even though the limit nut 210 contacts the screw shaft 224. Continued rotation of the rotatable member 104 results in continued rotation of the limit nut 210, which rotates the screw shaft 224 with respect to the hub 232 (e.g., the screw shaft 224 rotates relative to the hub 232 because the hub 232 is fixed against rotation because the hub 232 is keyed to the central shaft 220).

Figure 9:
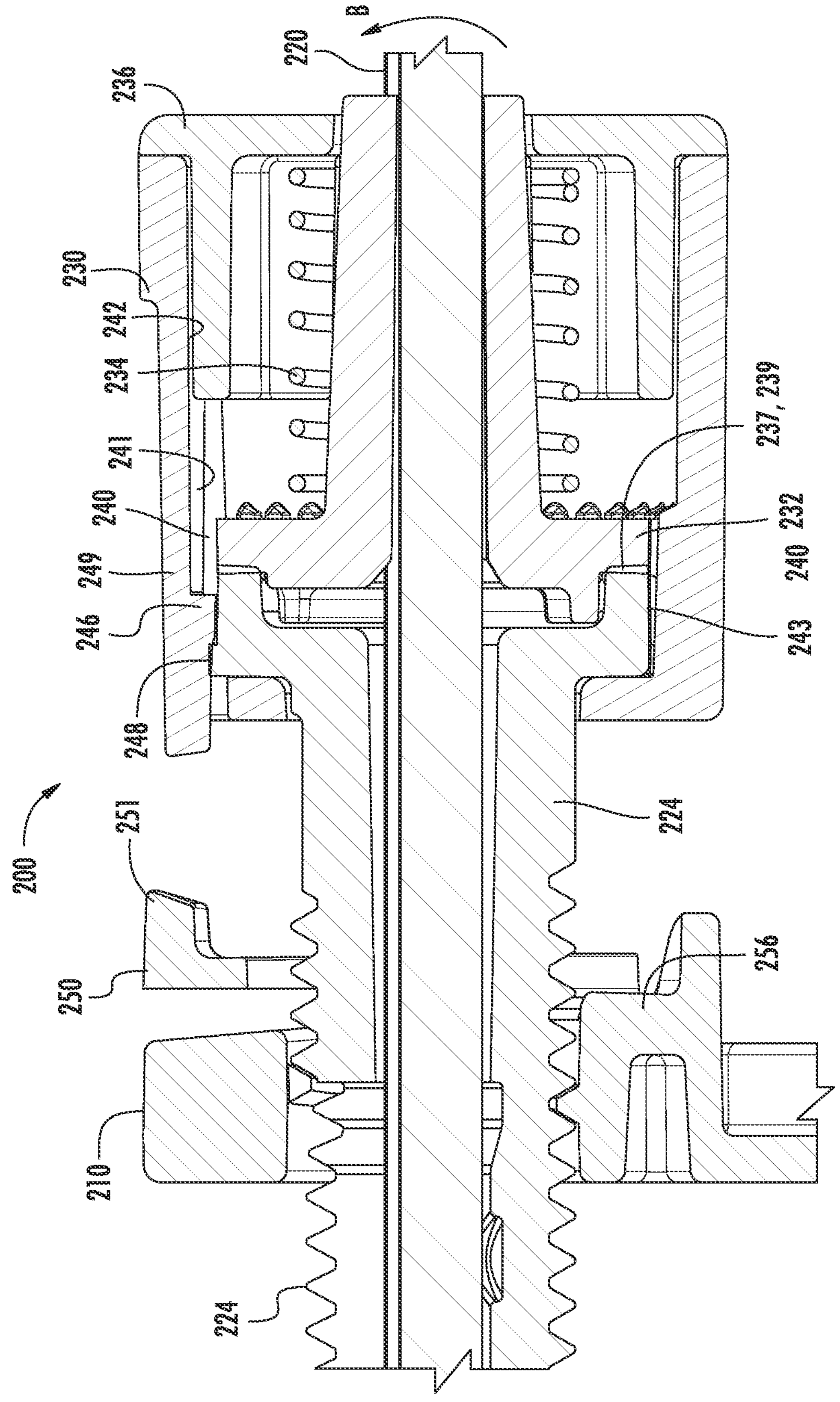
FIG. 9 is a cross-sectional view of the actuator of the limit stop assembly shown in FIG. 7, the limit stop assembly illustrated in the second state of operation.

Once the desired retraction travel limit of the covering 106 is reached, the covering 106 is moved in the opposite direction (e.g., direction B as shown in FIG. 9) causing the limit nut 210 to move out of contact and away from the screw shaft 224 (e.g., the limit nut stop 256 no longer contacts or presses on the shaft limit stop 257 because the limit nut 210 is rotating in the opposite direction), thus positioning the shaft limit stop 257 on the screw shaft 224 in its final position corresponding to the desired retraction limit of the covering 106. Additionally, rotating the rotatable member 104 in a second, opposite, rotational direction shown by arrow 'B' in FIG. 9 causes the limit nut 210 to contact the collar 230 allowing or causing the collar 230 to disengage from the screw shaft 224 resulting in the collar 230 moving into the second collar position. That is, in one example of an embodiment, rotating the rotatable member 104 in a second, opposite, rotational direction shown by arrow 'B' in FIG. 9 allows or causes the limit nut 210 to axially move away from the hub 232. In this direction, the actuator tab 250 of the limit nut 210 contacts the tab 249 of the collar 230. Rotation of the limit nut 210 in the opposite direction (as indicated by arrow 'B') causes the limit nut 210 (e.g., actuator tab 151) to contact and lift the tab 249, thus moving the projection 246 of the tab 249 out of contact with the screw shaft 224, which in turn allows the collar 230 to move longitudinally away from the screw shaft 224 via the force imparted by the spring 234 and into the second collar position so that the collar 230 now engages both the hub ridges 240 formed on the outer circumference of the hub 232, as well as the screw shaft ridges 243 formed on the outer circumference of the screw shaft 224.

That is, as a result of the limit nut 210 being axially moved away from the hub 232, (e.g., rotational direction shown by arrow 'B'), the actuator tab 251 formed on the actuator 250 coupled to the limit nut 210 contacts the tab 249 on, for example, the underside of the tab 249 to impart an upward force on the tab 249 because of, for example, the shapes of the contacting surfaces, to lift the tab 249 out of contact with the screw shaft 224 (e.g., abutment surface 248) thereby releasing the collar 230 from the screw shaft 224 and allowing the collar 230 to transition from the first collar position to the second collar position. With the collar 230 now in the second collar position, the collar ridges 241 on the inner surface 242 of the collar 230 now engage the hub ridges 240 formed on the outer circumference of the hub 232, as well as the screw shaft ridges 243 (FIG. 4) formed on the outer circumference of the screw shaft 224. In this second collar position, engagement of the collar ridges 241 with the screw shaft ridges 243 and the hub ridges 240 rotationally fixes the screw shaft 224 with respect to the hub 232. In addition, since the rotatable member 104 and the limit nut 210 are now being rotated in the second rotational direction, the limit nut stop 256 is no longer in contact with the shaft limit stop 257 (FIG. 8) on the screw shaft 224. As such, the limit nut 210 is free to rotate with respect to the screw shaft 224, which is now rotationally fixed with respect to the hub 232 and the collar 230. As a result, the retraction travel limit of the covering 106 is now set (e.g., the limit nut 210 is free to rotate when not contacting the screw shaft 224, however, the limit nut 210 is prevented from further rotation when the limit nut 210 contacts the screw shaft 224, when the limit nut stop 256 on the limit nut 210 contacts the shaft limit stop 257 on the screw shaft 224).

In use, after the retraction travel limit of the covering 106 has been set, subsequent deployment (e.g., lowering or extension) of the covering 106 causes the rotatable member 104 and the limit nut 210 to rotate in the direction shown by arrow 'B' in FIG. 9, thus causing the limit nut 210 to rotate about the screw shaft 224, moving to the left along the longitudinal axis of the screw shaft 224 (e.g., limit nut 210 axially moves away the hub 232) in FIG. 9. Inversely, retraction (e.g., raising) of the covering 106 causes the rotatable member 104 and the limit nut 210 to rotate in the direction shown by arrow 'A' in FIG. 7, thus causing the limit nut 210 to rotate about the screw shaft 224, moving to the right along the longitudinal length of the screw shaft 224 (e.g., limit nut 210 axially moves towards the hub 232) in FIG. 7 until the limit nut stop 256 on the limit nut 210 contacts the shaft limit stop 257 on the screw shaft 224. In either direction, with the collar 230 in the second collar position, rotation of the actuator 250 moves or slides past the tab 249 (e.g., the actuator 250 no longer interacts with the tab 249 formed on the collar 230).

Referring to FIGS. 10-22, examples of embodiments of the limit nut 210, the screw shaft 224, the hub 232, and the collar 230 will now be described and illustrated. It should be understood that these components may be provided in other forms and that the present disclosure should not be limited to the specific examples of embodiments illustrated unless otherwise claimed.

Figure 10:
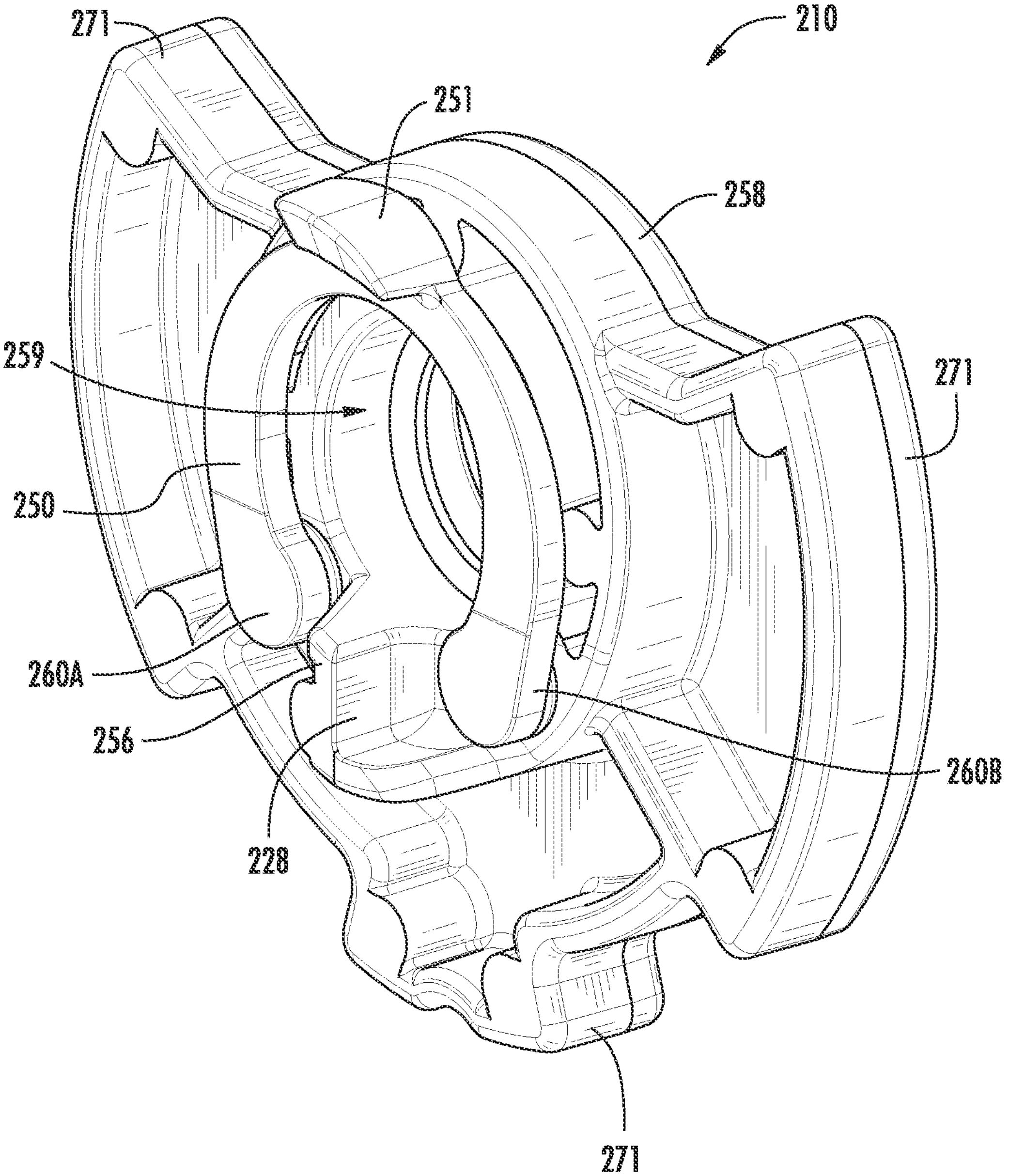
FIG. 10 is a perspective view of a limit nut of the limit stop assembly shown in FIG. 2.
Figure 11:
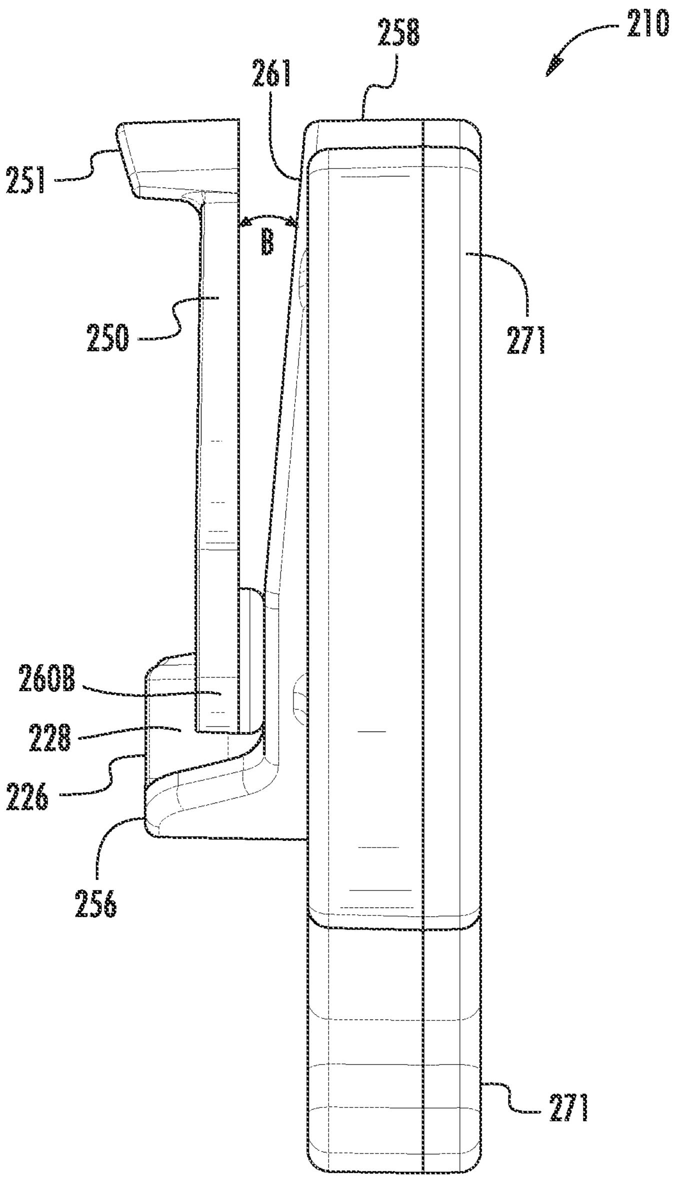
FIG. 11 is side view illustrating the limit nut of FIG. 10.

Referring to FIGS. 10 and 11, an example of an embodiment of a limit nut 210 according to non-limiting examples of embodiments of the present disclosure will be described in greater detail. As previously mentioned, in use, the limit nut 210 is operatively coupled to the rotatable member 104 of the architectural-structure covering 100 so that rotation of the rotatable member 104 by extending or retracting the covering 106 causes the limit nut 210 to rotate about and along a longitudinal axis of the screw shaft 224. That is, in one example of an embodiment, the limit nut 210 includes one or more arms 271 extending radially therefrom. The arms 271 contact the inwardly protruding projections 211 (FIG. 2) spaced circumferentially apart along an inner surface 213 of the rotatable member 104, thus causing the limit nut 210 and the rotatable member 104 to rotate together. It should be noted that the limit nut 210 may be coupled to the rotatable member 104 by any other mechanism.

As shown, the illustrated limit nut 210 includes a main body 258 having a central opening 259 therethrough for receiving the screw shaft 224 and the central shaft 220. As illustrated, the central opening 259 may be defined by an inner circumferential surface 268 having threads 269 (FIGS. 12 and 13) for engaging corresponding threads 288 (FIGS. 16 and 18) formed on the screw shaft 224. The threads 269 enable the limit nut 210 to traverse axially along the length of the screw shaft 224 as the limit nut 210 rotates.

Furthermore, as previously mentioned, the limit nut 210 also includes a limit nut stop 256. The limit nut stop 256 may include a contact surface 228 located on either side of the limit nut stop 256, the contact surfaces 228 being adapted and configured to contact the shaft limit stop 257 (FIGS. 8 and 18) on the screw shaft 224. As shown, the contact surface 228 extends perpendicularly, or substantially perpendicularly, from the main body 258.

Figure 12:
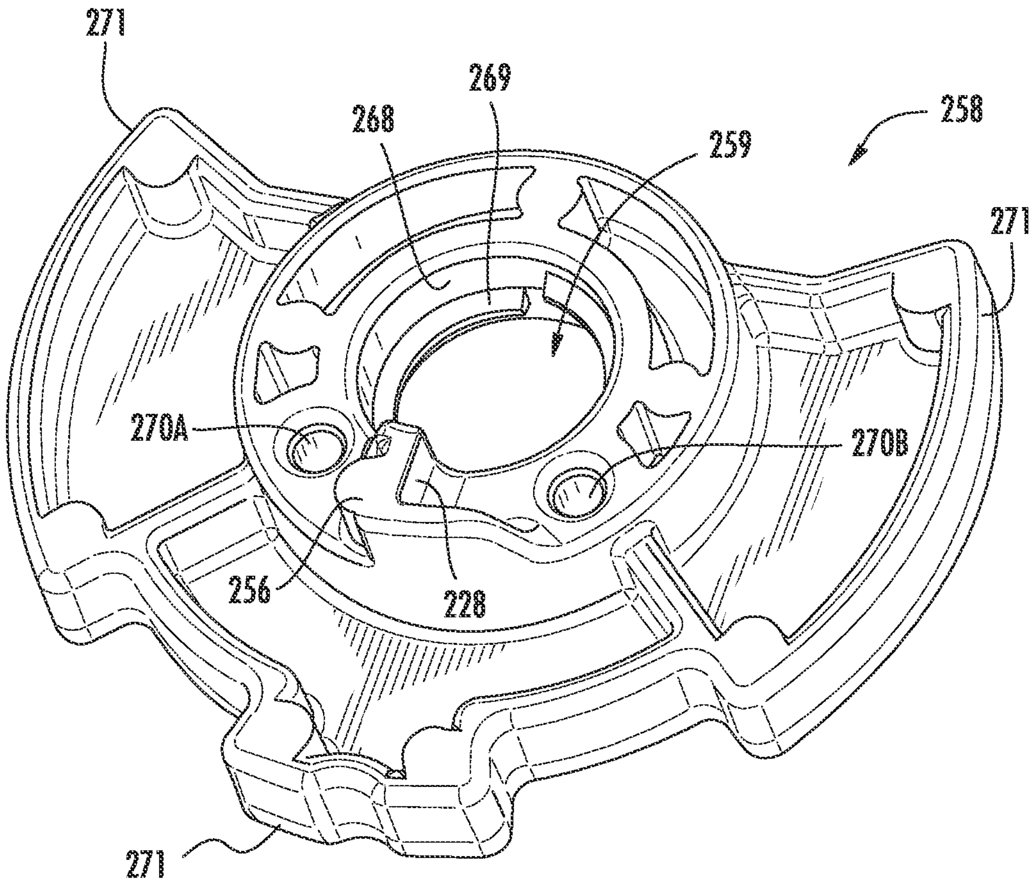
FIG. 12 is a perspective view of a main body of the limit nut of FIGS. 10 and 11.
Figure 13:
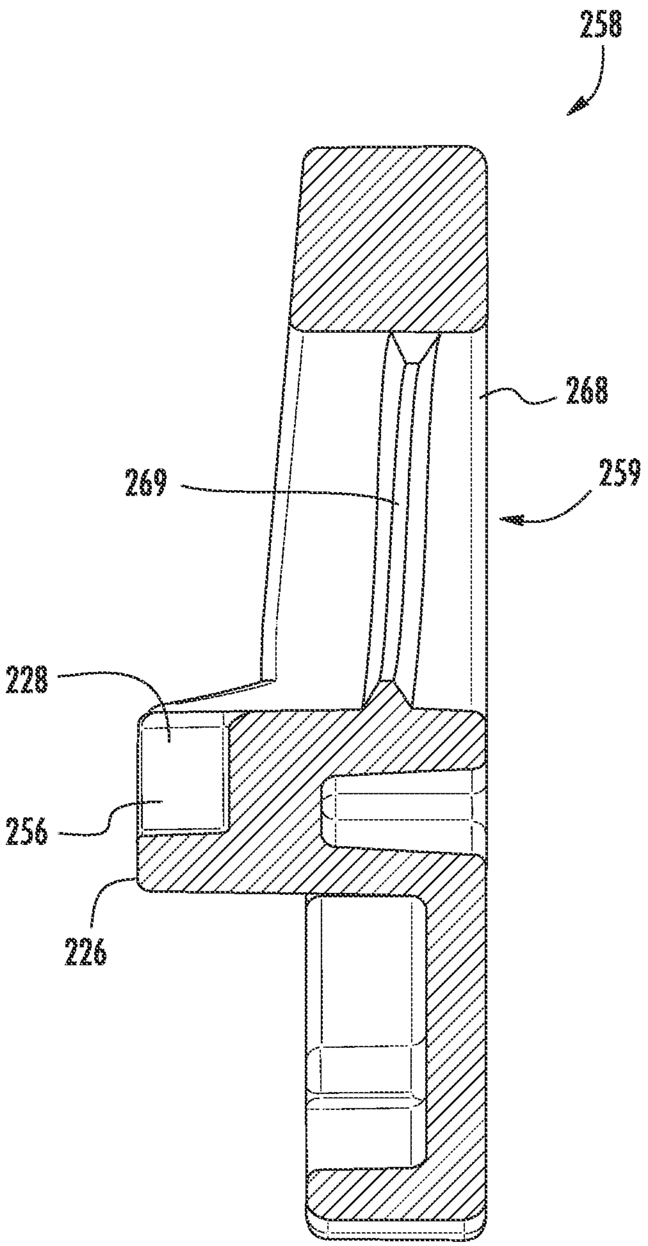
FIG. 13 is a cross-sectional view illustrating the main body of FIG. 12, taken along line XIII-XIII of FIG. 12.
Figure 14:
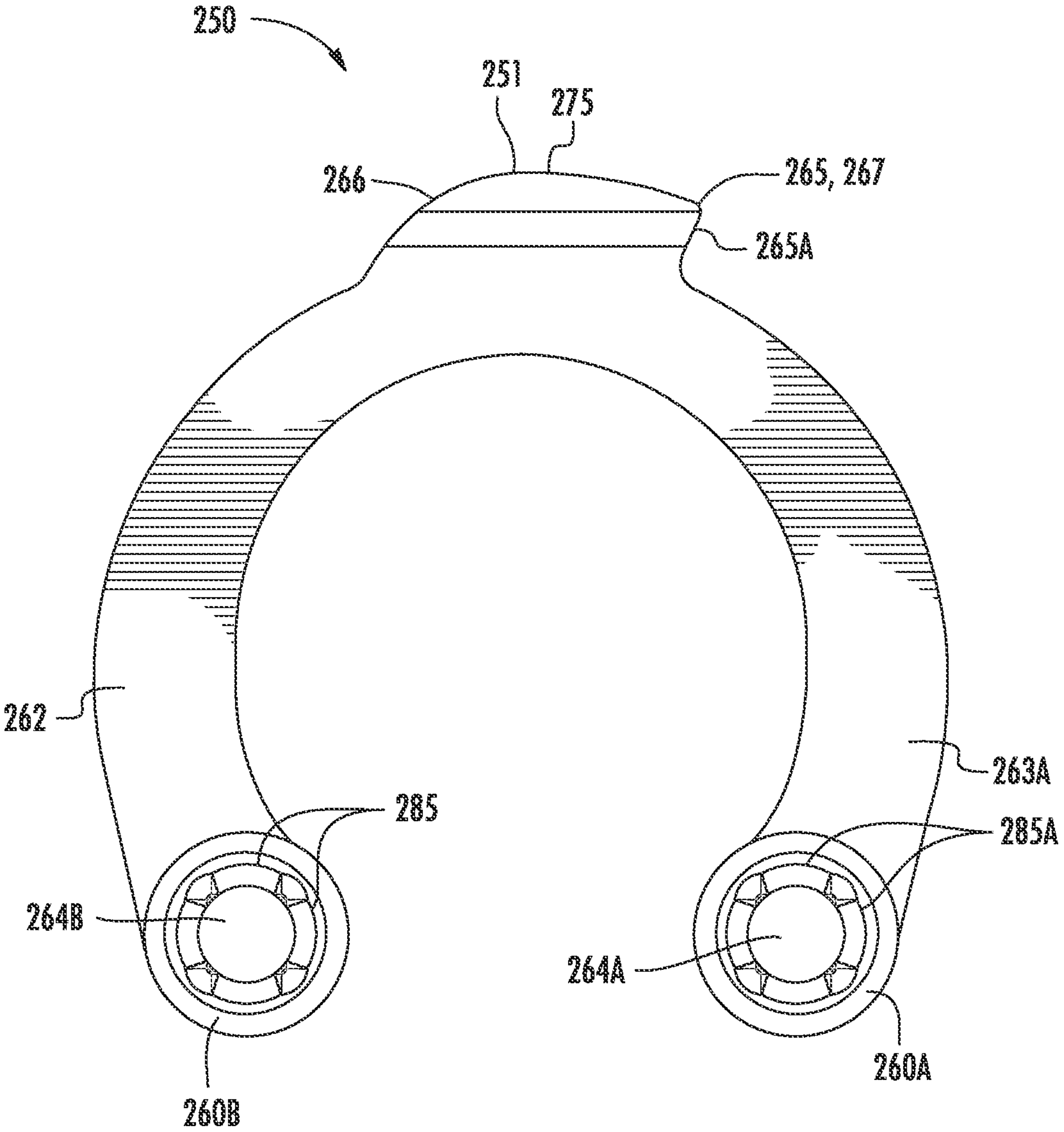
FIG. 14 is an end view of the actuator of the limit nut of FIGS. 10 and 11.
Figure 15:
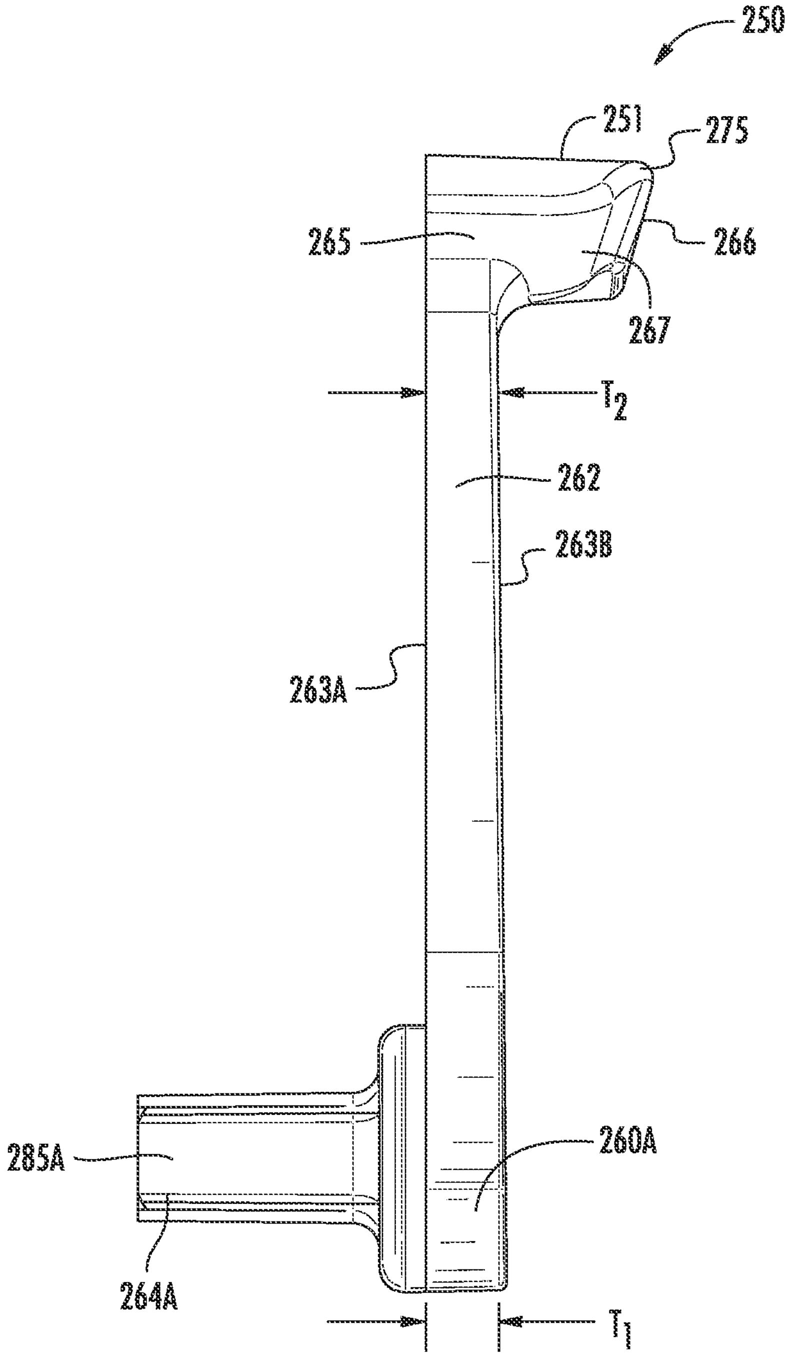
FIG. 15 is a side view of the actuator of the limit nut of FIG. 14.

In addition, the limit nut 210 may also include an actuator 250. The actuator 250 may be coupled to the main body 258 by any means now known or hereafter developed including, for example, through a set of actuator openings, friction fit, press fit, fasteners, adhesive, etc. Referring to FIGS. 12, 14 and 15, in one example of an embodiment, the main body 258 includes a set of actuator openings 270A, 270B for receiving a pair of keyed connectors 264A, 264B formed on the actuator 250. In other examples of embodiments, the main body 258 includes more or fewer actuator openings. The pair of keyed connectors 264A, 264B include one or more flat surfaces 285A operable to engage corresponding surfaces formed in actuator openings 270A, 270B formed in the main body 258 of the limit nut 210. During use, the keyed connectors 264A, 264B and the actuator openings 270A, 270B formed in the main body 258 enable the actuator 250 to be coupled to the limit nut 210 so that the actuator 250 and the main body 258 rotate together. Alternatively, the actuator 250 and the limit nut 210 could be integrally formed.

Referring to FIGS. 10, 11, 14, and 15, although not limited to any particular configuration, the actuator 250 may be generally horseshoe shaped having free ends 260A, 260B. As illustrated, when coupled to the main body 258, the limit nut stop 256 may be positioned between each of the free ends 260A, 260B of the actuator 250.

In addition, the actuator 250 of the example of an embodiment of FIGS. 10, 11, 14, and 15 includes an actuator tab 251 adapted and configured to contact the tab 249 of the collar 230 when the limit nut 210 is rotated. As best shown in FIG. 11, the actuator 250 extends away from a first side 261 of the main body 258 by an angle β to enable an actuator tab 251 to contact the tab 249 of the collar 230 when the limit nut 210 is rotated. In some examples of embodiments, the angle β is selected to permit the actuator tab 251 to extend outwardly from or beyond a plane defined by an outer surface 226 of the limit nut stop 256.

As shown, in one example of an embodiment, the pair of keyed connectors 264A, 264B extend away from the first side 263A of the actuator 250, while the actuator tab 251 angles away from the second side 263B. In some examples of embodiments, to provide sufficient stability and torque transfer between the actuator 250 and the main body 258, while still providing flexibility to the actuator tab 251, a thickness 'T1' of the free ends 260A and 260B is greater than a thickness 'T2' of the main section 262 proximate the actuator tab 251.

Referring to FIGS. 14 and 15, the actuator tab 251 includes a first end 265 and a second end 266 circumferentially distant from each other. Between the first end 265 and the second end 266 is an outer edge 275 provided to pass over an outer surface 227 (FIGS. 7 and 8) of the tab 249 of the collar 230. In some examples of embodiments, the first end 265 includes a flattened surface 265A extending outwardly from the main section 262, for example at an acute angle, and a sloped surface 267 for contacting the tab 249 (FIGS. 7 and 8) of the collar 230. Meanwhile, the second end 266 may slope more gradually from the main section 262. In use, the second end 266 is adapted and configured to contact the tab 249 to disengage the projection 246 of the tab 249 from the abutment surface 248 of the screw shaft 224 as the limit stop assembly 200 is transitioned from the first state of operation to the second state of operation. In some examples of embodiments, a thickness of the first end 265 of the actuator tab 251 is less than a thickness of the second end 266.

In the first state of operation, during rotation of the limit nut 210, as the actuator tab 251 contacts the tab 249 of the collar 230, the sloped surface 267 of the first end 265 of the actuator tab 251 initially contacts the leading edge 252 (FIGS. 7 and 8) of the tab 249 so that the actuator tab 251 contacts and slides past the tab 249 along a sloped end surface 253 of the tab 249. In some examples of embodiments, the actuator tab 251 and the sloped end surface 253 of the tab 249 include matching or complementary shapes or configurations (e.g., angles) to enable the actuator tab 251 to move past the tab 249 without altering the position of the collar 230. For example, in the illustrated example of an embodiment, the actuator tab 251 passes over the tab 249, as the actuator tab 251 moves towards the trailing edge 254 of the tab 249. In addition, the actuator tab 251 flexes towards the limit nut 250, as the actuator tab 251 rotates past the tab 249. In one example of an embodiment, the actuator tab 251 may also impart a downward force on the tab 249 as the actuator tab 251 moves past the tab 249, the configuration and/or increased thickness of the actuator tab 251 between the first end 265 and the second end 266 biases the tab 249 down/inwards toward the screw shaft 224. In this manner, the actuator tab 251 rotates past the tab 249 without lifting or decoupling the projection 246 of the tab 249 from the screw shaft 224. As a result, the projection 246 of the tab 249 remains in contact with the abutment surface 248 of the screw shaft 224 maintaining the limit stop assembly 200 in the first state of operation (e.g., the collar 230 remains in the first collar position). In other examples of embodiments, the actuator tab 251 moves past the tab 249 with minimal or no contact between the sloped surface 267 of the actuator tab 251 and the outer surface 227 of the tab 249. In some examples of embodiments, as will be described in greater detail below, the collar 230 includes one or more cutouts 255 defining the tab 249. The cutouts 255 permit flexing of the tab 249 during contact with the actuator tab 251.

Once the desired position of the travel limit has been met, rotation of the limit nut 210 in the opposite direction now causes the actuator tab 251 to first contact the trailing edge 254 (FIG. 8) of the tab 249. As such, instead of moving past the tab 249, when the limit nut 210 was axially moving towards the hub 232, the actuator tab 251 contacts and lifts the tab 249, thus moving the projection 246 of the tab 249 out of contact with the screw shaft 224, which in turn allows the collar 230 to move longitudinally away from the screw shaft 224 via the force imparted by the spring 234 and into the second collar position. That is, as a result of the limit nut 210 being axially moved away from the hub 232, (e.g., rotational direction shown by arrow 'B'), the actuator tab 251 formed on the actuator 250 coupled to the limit nut 210 contacts the tab 249 to impart an upward force on the tab 249 because of, for example, the shapes of the contacting surfaces. As a result, the projection 246 formed on tab 249 of the collar 230 is moved out of contact with the abutment surface 248 of the screw shaft 224. In some examples of embodiments, the projection 246 is forced above the abutment surface 248 of the screw shaft 224, causing the collar 230 to then be axially shifted away from the limit nut 210 under the biasing force of the spring 234 and into the second collar position.

Figure 16:
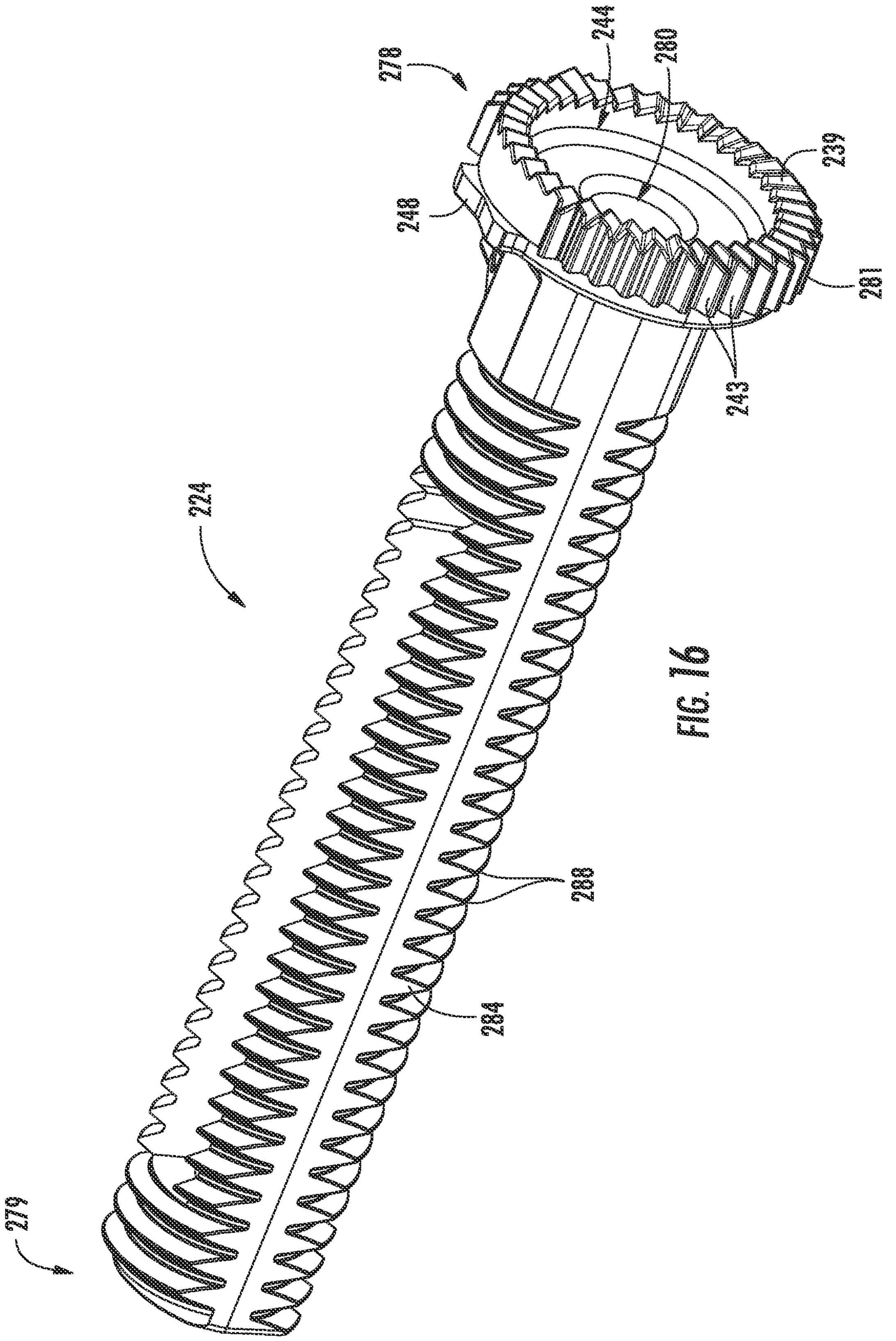
FIG. 16 is an end perspective view a screw shaft of the limit stop assembly shown in FIG. 2.
Figure 17:
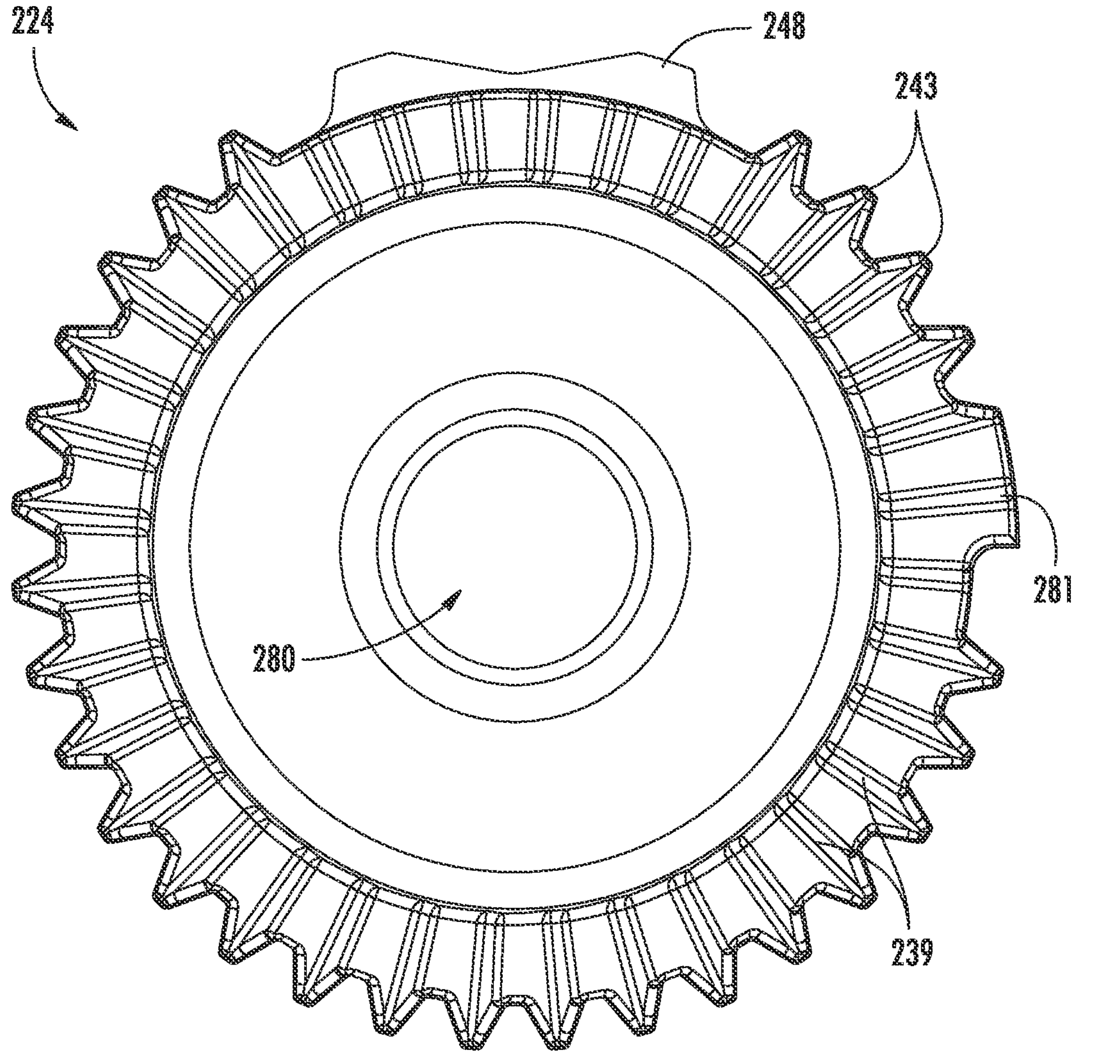
FIG. 17 is an end view of the screw shaft of FIG. 16.

Turning now to FIGS. 16-18, an example of an embodiment of a screw shaft 224 according to examples of embodiments of the present disclosure will be described in greater detail. As shown, the screw shaft 224 includes a first end 278 opposite a second end 279, and a hollow cavity 280 extending between the first and second ends 278, 279 for mounting over the central shaft 220. A central section 284 of the screw shaft 224 includes threading 288 along an outer circumferential surface thereof, wherein the threading 288 is operable to engage corresponding threading 269 formed on the inner circumferential surface 268 of the main body 258 of the limit nut 210. The threading 288 along the screw shaft 224 enables the limit nut 210 to traverse axially along the longitudinal length of the screw shaft 224 as the limit nut 210 rotates.

In one example of an embodiment, the first end 278 of the screw shaft 224 includes a circumferential ring 281 having an outer diameter larger than an outer diameter of the central section 284 and the second end 279 of the screw shaft 224. As shown, in some examples of embodiments, the circumferential ring 281 includes the abutment surface 248 extending outwardly therefrom for being engaged by the projection 246 of the tab 249. The circumferential ring 281 further includes the screw shaft ridges 243 on an outer circumference thereof for interacting with the collar ridges 241 on the inner surface 242 of the collar 230. The first end 278 of the screw shaft 224 further includes the screw shaft splines 239 for contacting the hub splines 237 of the hub 232. As illustrated, the screw shaft 224 may include a recess 244 for receiving a central projection 296 formed on the hub 232. When in contact with each other, the central projection 296 of the hub 232 may extend within the recess 244 formed in the first end 278 of the screw shaft 224.

Figure 19:
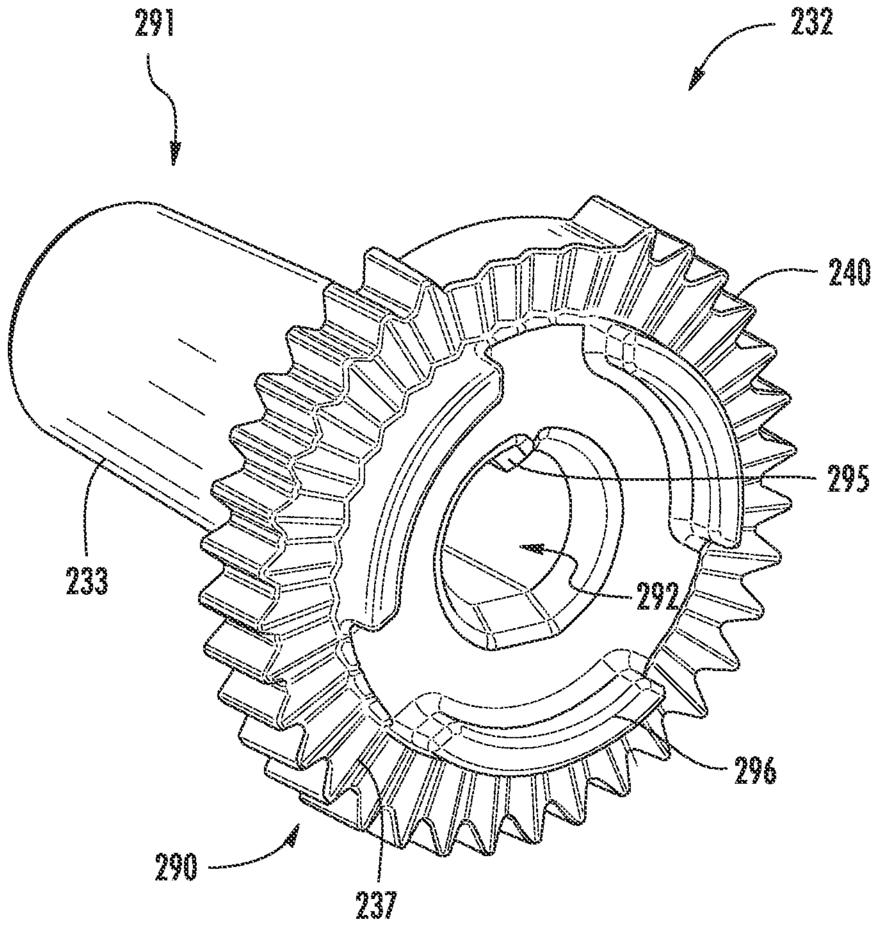
FIG. 19 is an end perspective view a hub of the limit stop assembly shown in FIG. 2.

Turning now to FIG. 19, an example of an embodiment of a hub 232 according to examples of embodiments of the present disclosure will be described in greater detail. As shown, the hub 232 includes a first end 290 opposite a second end 291, and a hollow cavity 292 extending between the first and second ends 290, 291 for mounting over the central shaft 220. As previously mentioned, the hub 232 is restricted from rotating with respect to the central shaft 220. However, the hub 232 is axially movable with respect to the central shaft 220, for example along a longitudinal direction of the central shaft 220. For example, in one example of an embodiment, the hub 232 is keyed to the central shaft 220, for example, the hub 232 includes a projection 295 for mating with a slot, a groove, or a flat surface 215 (FIG. 5) formed in an outer surface of the central shaft 220.

Also, as previously mentioned, the first end 290 of the hub 232 includes a plurality of hub splines 237 for engaging the plurality of shaft splines 239 formed on the screw shaft 224. The first end 290 of the hub 232 also includes the plurality of teeth or hub ridges 240 along an outer circumference thereof for interacting with the collar ridges 241 on the inner surface 242 of the collar 230. As illustrated, the hub 232 may include the central projection 296, the central projection 296 being arranged and configured to be received within the recess 244 formed in the first end 278 of the screw shaft 224.

Figure 20:
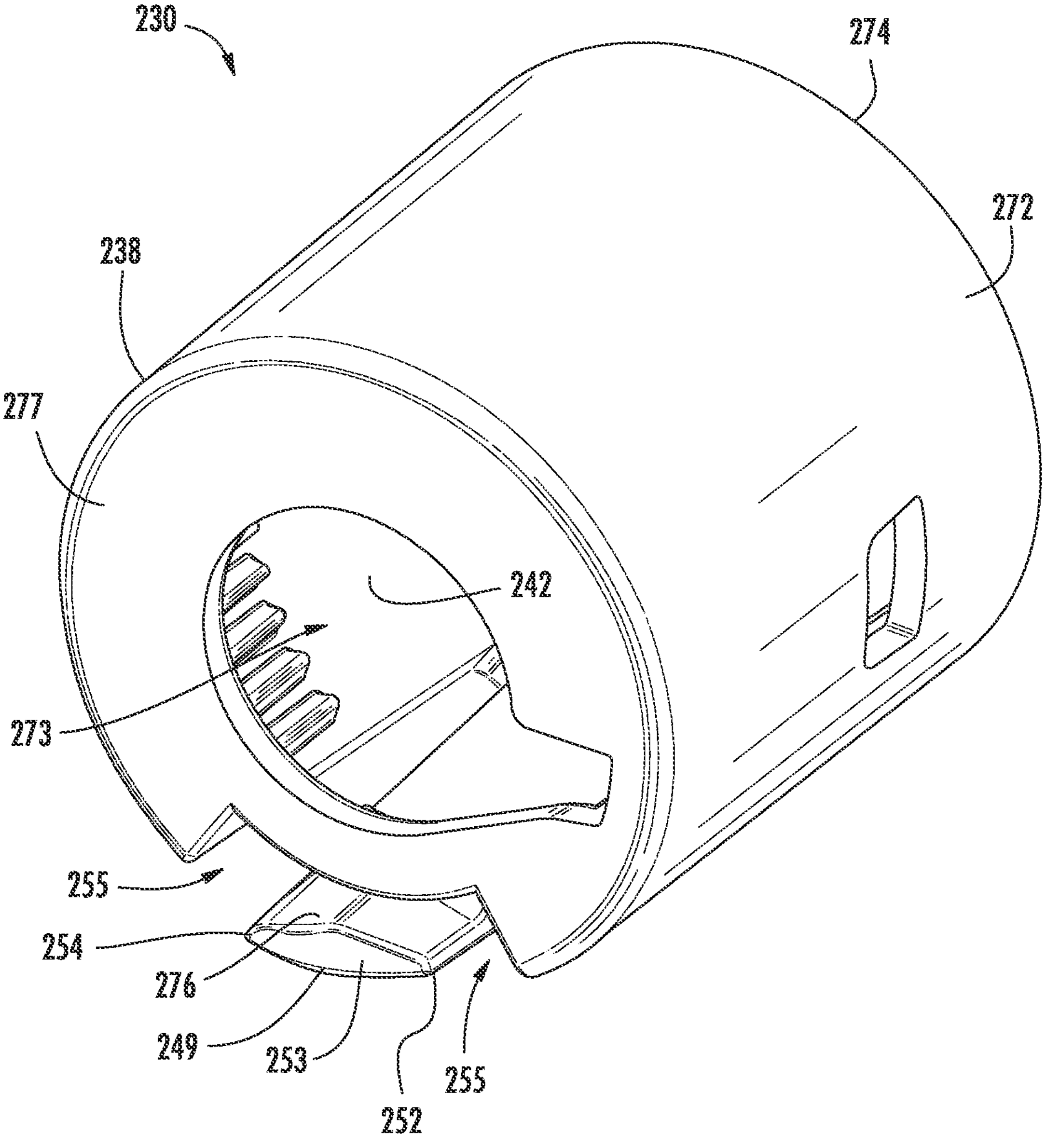
FIG. 20 is an end, perspective view of a collar of the limit stop assembly shown in FIG. 2.
Figure 21:
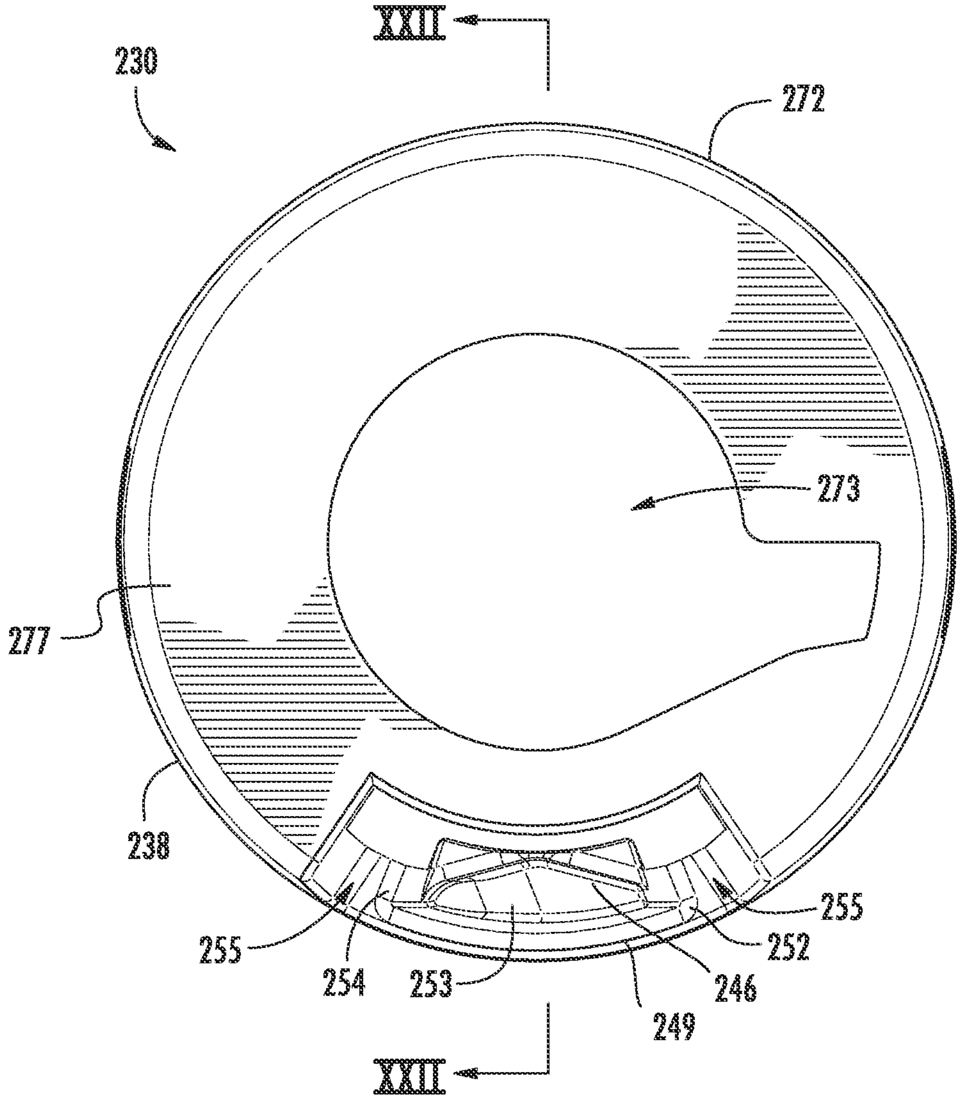
FIG. 21 is an end view the collar of FIG. 20.
Figure 22:
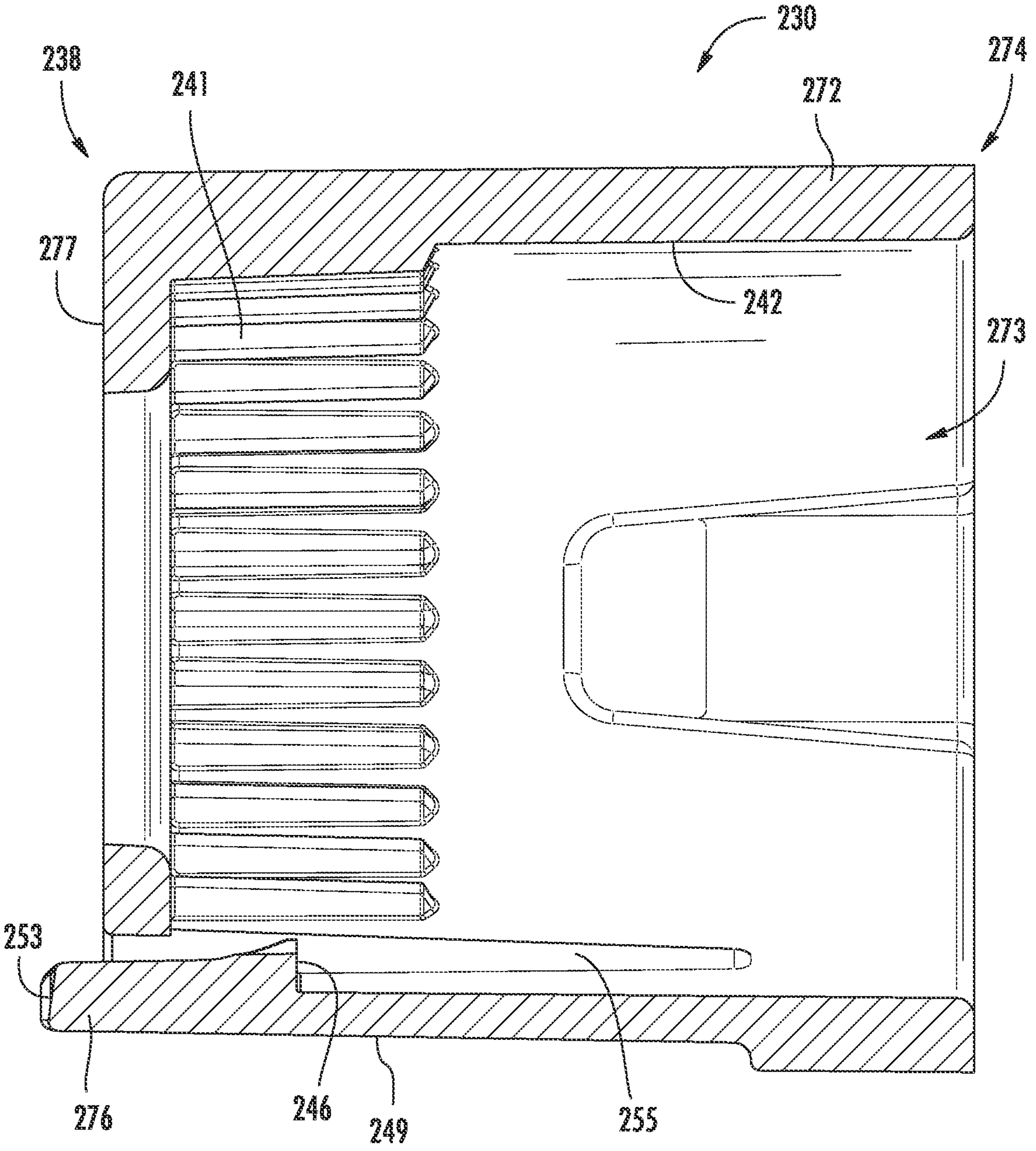
FIG. 22 a cross-sectional view illustrating the collar of FIG. 21, taken along line XXII-XXII of FIG. 21.

Turning now to FIGS. 20-22, an example of an embodiment of a collar 230 according to examples of embodiments of the present disclosure will be described in greater detail. As previously mentioned, in use, the collar 230 is movable between a first collar position and a second collar position. As shown, the illustrated collar 230 includes a hollow body 272 defining a cavity 273 therein. The hollow body 272 extends between the first end 238 and a second end 274. As shown, the collar ridges 241 extend along the inner surface 242 of the collar 230 adjacent to the first end 238 thereof. In some examples of embodiments, the collar ridges 241 extend circumferentially around the inner surface 242 between cutouts 255 formed in the collar 230. In the first collar position (FIGS. 4 and 6), the collar ridges 241 engage corresponding screw shaft ridges 243 formed in the outer circumference of the screw shaft 224, and in the second collar position (FIG. 9), the collar 230 engages both the screw shaft ridges 243 and the hub ridges 240 formed on the outer circumference of the hub 232. In this manner, in the second collar position, relative rotation between the hub 232 and the screw shaft 224 is prevented.

In the illustrative example of an embodiment, the collar 230 includes a tab 249. As shown, the tab 249 may be made by forming cutouts 255 extending partially between the first end 238 and the second end 274. The tab 249 includes the projection 246 extending towards the cavity 273. As previously mentioned, in the first collar position, the projection 246 engages the abutment surface 248 of the screw shaft 224 to hold the collar 230 in the first collar position. The tab 249 further includes the leading edge 252, the sloped end surface 253, and the trailing edge 254 as previously described.

In the example of an embodiment illustrated in FIGS. 20-22, a free end of the tab 249 defines a detachment tab 276 extending between the projection 246 and the sloped end surface 253 (FIGS. 20 and 22). As shown, the detachment tab 276 extends beyond a plane defined by a circumferential end surface 277 of the hollow body 272 at the first end 238.

By extending beyond the end surface 277, towards the limit nut 210, the detachment tab 276 is contacted by the actuator tab 251 as the actuator 250 is rotating away from the collar 230. In some examples of embodiments, the actuator tab 251 contacts the detachment tab 276 at the trailing edge 254 of the tab 249, lifting the tab 249 outwardly away from the abutment surface 248, and thus moving the projection 246 out of contact with the screw shaft 224.

Figure 23:
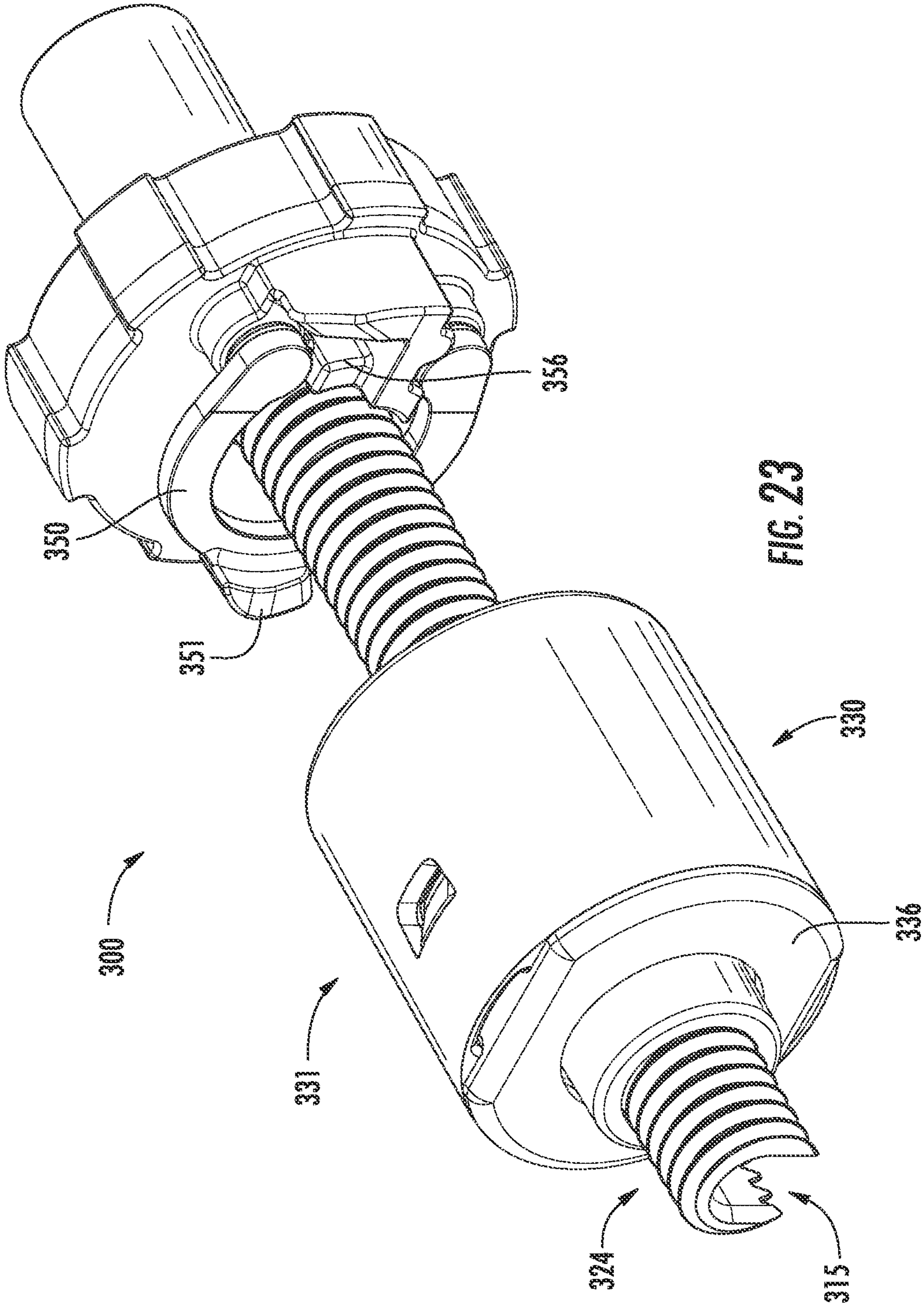
FIG. 23 is a perspective view illustrating an alternate example of an embodiment of a limit stop assembly in accordance with an illustrative example of an embodiment of the present disclosure.
Figure 24:
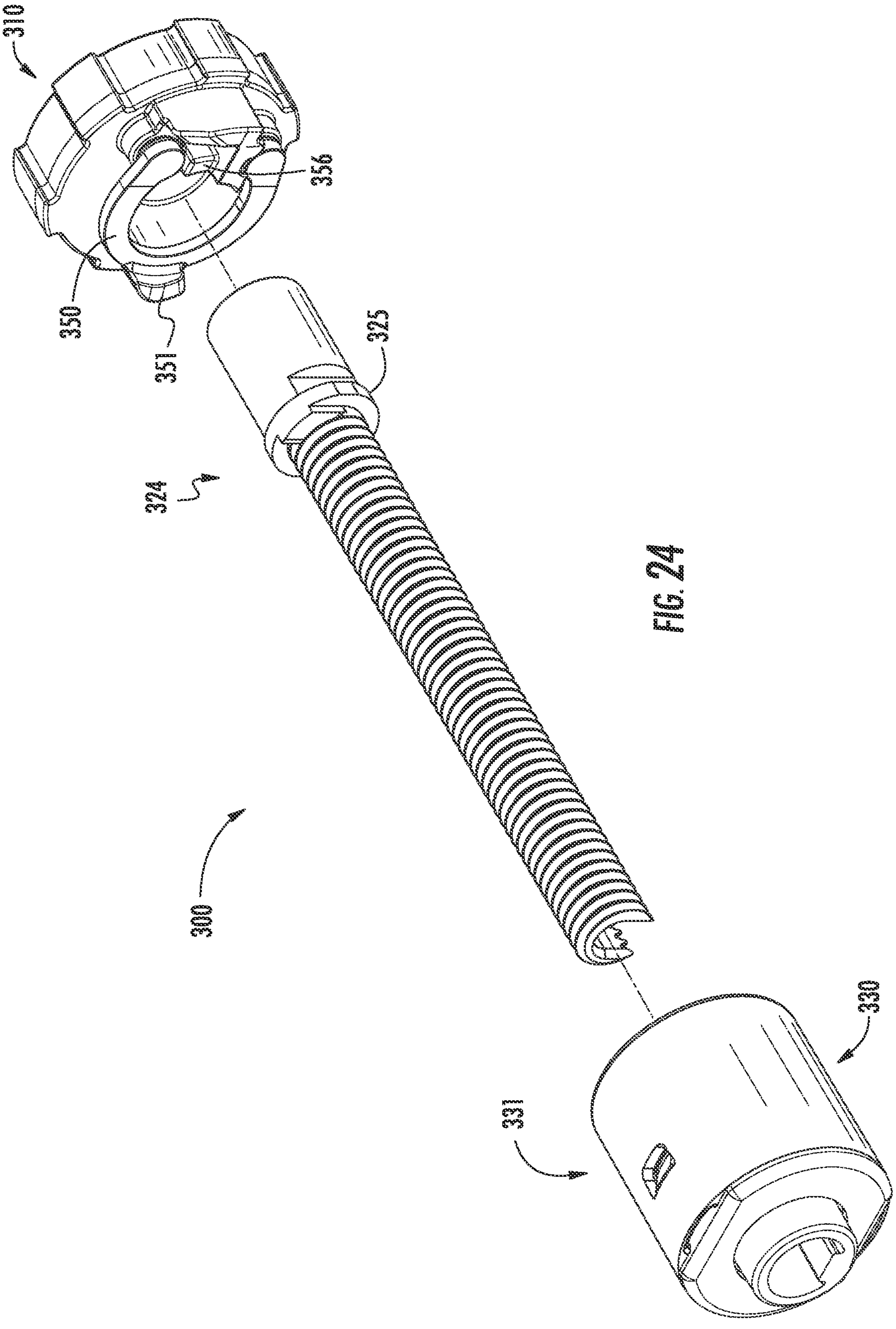
FIG. 24 is an exploded, perspective view illustrating the limit stop assembly shown in FIG. 23.
Figure 25:
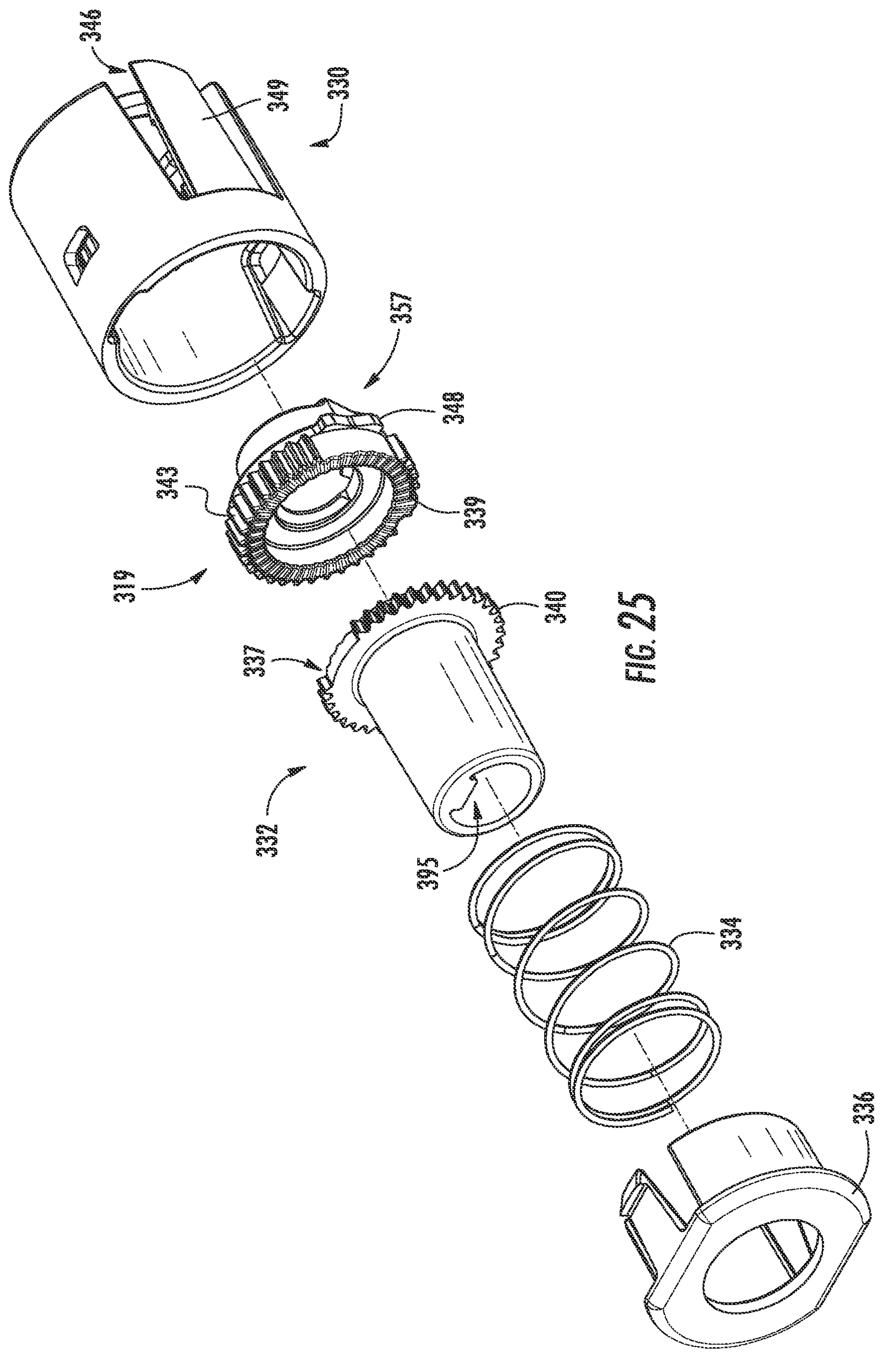
FIG. 25 is a partial, exploded, perspective view illustrating the limit stop assembly shown in FIG. 23, the partial view illustrating examples of an embodiment of the collar, locknut, hub, biasing member, and spring retainer.

Referring now to FIGS. 23 through 25, an alternate example of an embodiment of a limit stop assembly 300 according to an example of an embodiment of the present disclosure will now be described. In use, the limit stop assembly 300 is substantially similar to the limit stop assembly 200 described above but for the differences indicated herein. As such, for the sake of brevity, detailed description of some of the components such as, for example, the limit nut, the screw shaft, the hub, and the collar, are omitted.

Generally speaking, similar to the limit stop assembly 200 described above, the limit stop assembly 300 may be, for example, coupled to, and/or located within, the rotatable member 104 for regulating the deployment of the covering 106. In use, the limit stop assembly 300 is adapted and configured for engaging the rotatable member 104 so that rotation of the rotatable member 104 rotates at least a portion or a component of the limit stop assembly 300. Thus, initially, operation of the covering 106 causes setting of a limit stop for the covering 106. In this manner, in one example of an embodiment, with the limit stop assembly 300 in a first state of operation and with the covering 106 in the retracted position, the covering 106 is lowered or extended to a desired extension limit for the covering 106 when in the extended position. Once the desired extension limit is reached, the covering 106 is moved towards the retracted position, which, in turn, transitions the limit stop assembly 300 from the first state of operation to the second state of operation. In the second state of operation, the limit stop assembly 300 sets a position of a limit stop so that future, continued operation of the covering 106 is constrained by the position of the stop. Alternatively, as previously mentioned, in one example of an embodiment, with the limit stop assembly 300 in a first state of operation and with the covering 106 in the extended position, the covering 106 is raised to a desired retraction limit for the covering 106 when in the retracted position. Once the desired retraction limit is reached, the covering 106 is moved towards the extended position, which, in turn, transitions the limit stop assembly 300 from the first state of operation to a second state of operation. In the second state of operation, the limit stop assembly 300 sets a position of a limit stop so that future, continued operation of the covering 106 is constrained by the position of the stop.

In one example of an embodiment, the limit stop assembly 300 includes a limit nut 310, a screw shaft 324, a locknut 319 (FIG. 25), a collar 330, and a hub 332 (FIG. 25). In connection with the current example of an embodiment, during use, the screw shaft 324 is non-rotatably received on the central shaft 220 (FIG. 2). That is, the screw shaft 324 is inhibited or prevented from rotating relative to the central shaft 220. The screw shaft 324 may be non-rotatably coupled to the central shaft 220 by any now known or hereafter developed mechanism. For example, in one example of an embodiment, the screw shaft 324 may be keyed to the central shaft 220.

The limit nut 310 is rotatably received on the screw shaft 324. In addition, the limit nut 310 is operatively coupled to the rotatable member 104 of the architectural-structure covering 100 so that rotation of the rotatable member 104 by raising/retracting or lowering/extending of the covering 106, causes the limit nut 310 to rotate about and along a longitudinal axis of the screw shaft 324.

In connection with the current example of an embodiment, the limit stop assembly 300 includes a locknut 319. In use, as will be described in greater detail below, the locknut 319 functions substantially similar to the end portion 219 of the screw shaft 224 used in the limit stop assembly 200 as previously described. However, in connection with the current example of an embodiment, during use, the locknut 319 is rotatable received on the screw shaft 324 and thus rotatable and axially translatable with respect to the screw shaft 324 and hence the central shaft 220. This is in contrast to the limit-stop assembly 200 previously described, where the end portion 219 was integrally formed with the screw shaft 224. In addition, in connection with the current example of an embodiment, the hub 332 is received on the screw shaft 324 so that, during use, it can contact the locknut 319. During use, the hub 332 is non-rotatably received on the screw shaft 324. However, the hub 332 is axially movable with respect to the screw shaft 324, for example along a longitudinal direction of the screw shaft 324, so that, as will be described in greater detail below, rotation of the locknut 319 relative to the screw shaft 324 causes the hub 332 to move axially relative to the screw shaft 324. The hub 332 may be non-rotatably coupled to the screw shaft 324 by any now known or hereafter developed mechanism. For example, in one example of an embodiment, similar to the hub 232 used in connection with the limit stop assembly 200, the hub 332 includes a projection 395 (FIG. 25) for mating with a slot or groove 315 (FIG. 23) formed in an outer surface of the screw shaft 324, although it is envisioned that other arrangements for keying the hub 332 to the screw shaft 324 may be used.

In use, the collar 330 is movable between first and second collar positions. Substantially similar in operation as collar 230 previously described, in the first collar position, the collar 330 engages the locknut 319. The hub 332 is in contact with the locknut 319 (e.g., axially extending hub splines 337 located on an end of the hub 332 engage corresponding axially extending screw shaft splines 339 located on an end of the locknut 319). In the first collar position, the collar 330 is arranged and configured to rotate relative to the screw shaft 324. In addition, in the first collar position, the locknut 319 is arranged and configured to rotate relative to the screw shaft 324. With respect to the screw shaft 224, as described in greater detail herein, rotation of the locknut 319 relative to the screw shaft 224 via, for example, rotation of the limit nut 310, causes the locknut 319 and collar 330 to rotate relative to the screw shaft 324, which causes the hub 332 to axially move relative to the screw shaft 324. Thus arranged, in the first collar position, the entire subassembly 331 including the collar 330, the locknut 319, and the hub 332 are axially movable (e.g., translate) relative to the screw shaft 324 along a longitudinal axis thereof. Thus arranged, in contrast to the limit stop assembly 200 previously described, in the current example of an embodiment of the limit stop assembly 300, the entire subassembly 331 including the collar 330, the locknut 319, and the hub 332 are axially movable along a length of the threaded screw shaft 224.

In the second collar position, the collar 330 engages both the locknut 319 and the hub 332, as previously described. As a result of the hub 332 being non-rotatably mounted onto the screw shaft 324, the collar 330, the locknut 319, the screw shaft 324, the hub 332, and the central shaft 220 are prevented from relative rotation with respect to one another.

In the first collar position, rotation of the rotatable member 104 causes the limit nut 310 to rotate with respect to the screw shaft 324 and thus translate along a length of the screw shaft 324. In the first collar position, continued rotation of the limit nut 310 after contacting the locknut 319 causes the locknut 319 and the collar 330 to rotate relative to the screw shaft 324. In connection with the current example of an embodiment, contact of the locknut 319 with the hub 332 causes the hub 332 to translate axially relative to the screw shaft 324. That is, in the first collar position, rotation of the limit nut 310 after contacting the locknut 319 causes the subassembly 331 including the locknut 319, the collar 330, and the hub 332 to axially move relative to the screw shaft 324 to allow for further rotation of the rotatable member 104 to allow the covering 106 to move to its desired limit position.

In one example of an embodiment, similar to the limit stop assembly 200 described above, the limit nut 310 may include a limit nut stop 356 and the locknut 319 may include a locknut limit stop 357 (FIG. 25). In use, rotation of the limit nut 310 relative to the screw shaft 324 causes the limit nut stop 356 to contact the locknut limit stop 357. Thereafter, continued rotation of the limit stop assembly 300 (caused by, for example, continued rotation of the rotatable member 104 after the limit nut stop 356 formed on the limit nut 310 contacts locknut limit stop 357 formed on the locknut 319) causes the locknut 319, the collar 330, and the hub 332 to axially move relative to the screw shaft 324.

Similar to the operation of the limit stop assembly 200, once the desired position of the covering 106 is achieved, the covering 106 is moved in the opposite direction causing the collar 330 to move into the second collar position. In the second collar position, the collar 330 engages both the locknut 319 and the hub 332, thus preventing rotation of the subassembly 331 including the locknut 319, the hub 332, and the collar 330 relative to the screw shaft 324, and thus setting the travel limit of the covering 106, for future, continued operation. With the collar 330 in the first collar position, the limit stop assembly 300 is in the first state of operation, and with the collar 330 in the second collar position, the limit stop assembly 300 is in the second state of operation.

As shown in FIG. 25, the limit stop assembly 300 may include an optional biasing member such as, for example, a spring 334 to bias the collar 330 into the second collar position. That is, the biasing member (e.g., spring) 334 may axially bias the collar 330 away from the hub 332 and the locknut 319. As previously described in connection with the limit stop assembly 200 described above, in one example of an embodiment, the biasing member (e.g., spring) 334 may be operatively held in position by a spring retainer 336. As the biasing member (e.g., spring) 334, spring retainer 336, and collar 330 are substantially similar to the biasing member (e.g., spring) 234, spring retainer 236, and collar 230 described above in connection with limit stop assembly 200, details regarding their construction and operation are omitted for sake of brevity.

Thus arranged, similar to operation of the limit stop assembly 200 previously described, with the collar 330 in the first collar position, in one example of an embodiment, the hub 332 may include a plurality of hub splines 337 (e.g., axially extending hub splines—splines extend axially from an end of the hub 332 (in contrast to circumferential or outwardly extending ridges)) and the locknut 319 may include a plurality of locknut splines 339 (e.g., axially extending shaft splines—splines extend axially from an end of the locknut 319 (in contrast to circumferential or outwardly extending ridges)). In use, the hub 332 contacts the locknut 319 (e.g., the hub splines 337 contact the locknut splines 339). The hub splines 337 and the locknut splines 339 are arranged and configured so that, when the collar 330 is in the first collar position, relative rotation between the locknut 319 and the hub 332 is possible. That is, in the first collar position, the rotational coupling of the locknut 319 and the hub 332 via the hub splines 337 and the locknut splines 339 may be overcome by, for example, continued rotation of the rotatable member 104 after the limit nut 310 contacts the locknut 319 causing the locknut 319 and the collar 330 to rotate relative to the screw shaft 324, and the hub 332 to axially translate relative to the screw shaft 324 to allow for further rotation of the rotatable member 104 to allow the covering 106 to move to its desired limit position (e.g., hub 332 moves relative to the screw shaft 324).

In addition, similar to operation of the limit stop assembly 200 previously described, in one example of an embodiment, the locknut 319 includes teeth or ridges 343 on an outer circumference thereof for interacting with inwardly directed collar ridges 341 (similar to ridges 241) formed on an inner surface of the collar 330. The hub 332 also includes outwardly directed teeth or hub ridges 340 along an outer circumference thereof for interacting with the collar ridges 341 on the inner surface of the collar 330. As will be described in greater detail below, in the illustrated example of an embodiment, the collar ridges 341 formed on the inner surface of the collar 330 interact with the locknut ridges 343 when in the first collar position (e.g., when the limit stop assembly 300 is in the first state of operation with the collar 330 in the first collar position). In the first collar position, the collar ridges 341 and the hub ridges 340 are axially displaced with respect to each other. Thereafter, when the collar 330 is transitioned to the second collar position, the collar ridges 341 interact with the locknut ridges 343 formed on the locknut 319 and with the hub ridges 340 formed on the hub 332 (e.g., when the limit stop assembly 300 is in the second state of operation with the collar 330 in the second collar position) to prevent the locknut 319 from rotating with respect to the hub 332. That is, in the first collar position, the collar ridges 341 formed on the inner surface of the collar 330 engage the locknut ridges 343 formed on the outer circumference of the locknut 319. However, the collar ridges 341 formed on the inner surface of the collar 330 do not engage the hub ridges 340 disposed along the outer circumference of the hub 332. In this manner, in the first collar position, the hub 332 and the locknut 319 are arranged and configured so that rotation of the locknut 319 relative to the hub 332 is permitted. In the second collar position, the collar 330 is engaged with the locknut 319 and the hub 332, and as a result of the hub 332 being non-rotatably mounted onto the screw shaft 324, the collar 330, the locknut 319, and the hub 332 are prevented from relative rotation with respect to one another.

Similar to the limit stop assembly 200 previously described, in one example of an embodiment, when coupled together, the hub ridges 340 formed on the illustrated hub 332 and the locknut ridges 343 formed on the illustrated locknut 319 are positioned side-by-side (e.g., axially and radially aligned). That is, in some examples of embodiments, the locknut ridges 343 disposed on the outer circumference of the locknut 319 and the hub ridges 340 disposed on the outer circumference of the hub 332 are configured to be adjacent and aligned with one another when the hub splines 337 of the hub 332 contact the locknut splines 339 of the locknut 319.

Similar to the limit stop assembly 200 previously described, in the first collar position, the collar 330 may be coupled to the locknut 319 by any mechanism now known or hereafter developed. That is, in use, the collar 330 may be arranged and configured so that it is in mating contact with the locknut 319 so that the collar 330 is maintained in the first collar position against the biasing force of, for example, the spring 334. For example, in one example of an embodiment, the collar 330 includes a tab 349 having a projection 346 disposed at a free end thereof. The tab 349 is formed in the outer circumference of the collar 330. As such, the tab 349 is axially extending while the projection 346 extends inwardly towards the locknut 319. In this manner, in the first collar position, the projection 346 contacts a corresponding projection or abutment surface 348 of the locknut 319. For example, the projection 346 and the abutment surface 348 include complimentary abutting surfaces operable to prevent axial movement of the collar 330 away from the locknut 319 along the longitudinal axis of the screw shaft 324. As such, in the first collar position, the collar 330 is maintained in the first collar position via, for example, the coupling between the projection 346 and the abutment surface 348.

An example method of operation will now be described. During use, similar to the limit stop assembly 200 previously described, with the limit stop assembly 300 initially in the first state of operation (e.g., with the collar 330 in the first collar position), rotation of the rotatable member 104 by initially moving the covering 106 causes the rotatable member 104 to rotate, which in turn rotates the limit nut 310 and causes the limit nut 310 to axially translate or move about the screw shaft 324 along the longitudinal axis of the central shaft 220. In one example of an embodiment, the limit nut 310 includes an actuator 350, such as a leaf spring, press-fitted thereto. Rotation of the limit nut 310 caused by moving the covering 106 rotates the actuator 350 about the screw shaft 324 and the central shaft 220, for example, in a first rotational direction. As the actuator 350 continues to rotate, an actuator tab 351 of the actuator 350 is brought into position proximate the tab 349 of the collar 330. However, similar to the limit stop assembly 200 previously described, with the collar 330 in the first collar position, the actuator 350 moves or slides past the collar 330, for example, the tab 349 formed on the collar 330, without altering the position of the collar 330.

As the actuator 350 continues to rotate about the screw shaft 324, the actuator tab 351 passes a trailing edge 354 (similar to 254) of the tab 349. At this point, continued rotation of the rotatable member 104 causes the limit nut stop 356 positioned on the limit nut 310 to contact the locknut limit stop 357 positioned on the locknut 319. Due to the contact between the limit nut stop 356 and the locknut limit stop 357, continued rotation of the rotatable member 104, causes the limit nut 310 and the locknut 319 to rotate together. That is, continued rotation of the rotatable member 104, overcomes the engaging force between the hub splines 337 and the locknut splines 339 so that the locknut 319 is rotatable relative to the hub 332. In this manner, the covering 106 continues to be moved from, for example, the retracted position towards the extended position even though the limit nut 310 contacts the locknut 319. Continued rotation of the rotatable member 104 results in continued rotation of the limit nut 310, which rotates the locknut 319 with respect to the screw shaft 324, which causes the hub 332 to axially translate relative to the screw shaft 324 (e.g., the locknut 319 rotates relative to the hub 332 because the hub 332 is fixed against rotation because the hub 332 is keyed to the screw shaft 324).

Once the desired extension travel limit of the covering 106 is reached, similar to the limit stop assembly 200 previously described, the covering 106 is moved in the opposite direction causing the limit nut 310 to move out of contact and away from the locknut 319 (e.g., the limit nut stop 356 no longer contacts or presses on the locknut limit stop 357 because the limit nut 310 is rotating in the opposite direction), thus positioning the locknut limit stop 357 on the locknut 319 in its final position corresponding to the desired extension limit of the covering 106. Additionally, rotating the rotatable member 104 in a second, opposite, rotational direction causes the limit nut 310 to contact the collar 330 causing the collar 330 to disengage from the locknut 319 resulting in the collar 330 moving into the second collar position. That is, in one example of an embodiment, rotating the rotatable member 104 in a second, opposite, rotational direction causes the limit nut 310 to axially move away from the locknut 319 and the hub 332. In this direction, the actuator tab 350 of the limit nut 310 contacts the tab 349 of the collar 330. Rotation of the limit nut 310 in the opposite direction causes the limit nut 310 (e.g., actuator tab 351) to contact and lift the tab 349, thus moving the projection 346 of the tab 349 out of contact with the locknut 319, which in turn allows the collar 330 to move longitudinally away from the locknut 319 via the force imparted by the spring 334 and into the second collar position so that the collar 330 now engages both the hub ridges 340 formed on the outer circumference of the hub 332, as well as the locknut ridges 343 formed on the outer circumference of the locknut 319.

That is, similar to the limit stop assembly 200 previously described, as a result of the limit nut 310 being axially moved away from the locknut 319 and the hub 332, the actuator tab 351 formed on the actuator 350 coupled to the limit nut 310 contacts the tab 349 on, for example, the underside of the tab 349 to impart an upward force on the tab 349 because of, for example, the shapes of the contacting surfaces, to lift the tab 349 out of contact with the locknut 319 (e.g., abutment surface 348) thereby releasing the collar 330 from the locknut 319 and transitioning the collar 330 from the first collar position to the second collar position. With the collar 330 now in the second collar position, the collar ridges 341 on the inner surface of the collar 330 now engage the hub ridges 340 formed on the outer circumference of the hub 332, as well as the locknut ridges 343 formed on the outer circumference of the locknut 319. In this second collar position, engagement of the collar ridges 341 with the locknut ridges 343 and the hub ridges 340 rotationally fixes the locknut 319 and the hub 332 with respect to the screw shaft 324. In addition, since the rotatable member 104 and the limit nut 310 are now being rotated in the second rotational direction, the limit nut stop 356 is no longer in contact with the locknut limit stop 357 on the locknut 319. As such, the limit nut 310 is free to rotate with respect to the locknut 319, which is now rotationally fixed with respect to the hub 232 and the collar 230. As a result, the extension travel limit of the covering 106 is now set.

In use, similar to the limit stop assembly 200 previously described, after the extension travel limit of the covering 106 has been set, subsequent retraction (e.g., raising) of the covering 106 causes the rotatable member 104 and the limit nut 310 to rotate, thus causing the limit nut 310 to rotate about the screw shaft 324 (e.g., limit nut 310 axially moves away the locknut 319 and the hub 332). Inversely, extension (e.g., lowering or extending) of the covering 106 causes the rotatable member 104 and the limit nut 310 to rotate in the opposite direction, thus causing the limit nut 310 to rotate about the screw shaft 324 (e.g., limit nut 310 axially moves towards the locknut 319 and the hub 332) until the limit nut stop 356 on the limit nut 310 contacts the locknut limit stop 357 on the locknut 319. In either direction, with the collar 330 in the second collar position, rotation of the actuator 350 moves or slides past the tab 349 (e.g., the actuator 350 no longer interacts with the tab 349 formed on the collar 330). Thus arranged, during use, the limit nut 310 is free to axially move along the length of the screw shaft 324, and thus the covering 106 is free to extend and retract, as defined by the fixed position of the locknut 319 on one end of the screw shaft 324 and an enlarged end portion 325 (FIG. 24) formed on the other end of the screw shaft 324.

Figure 26:
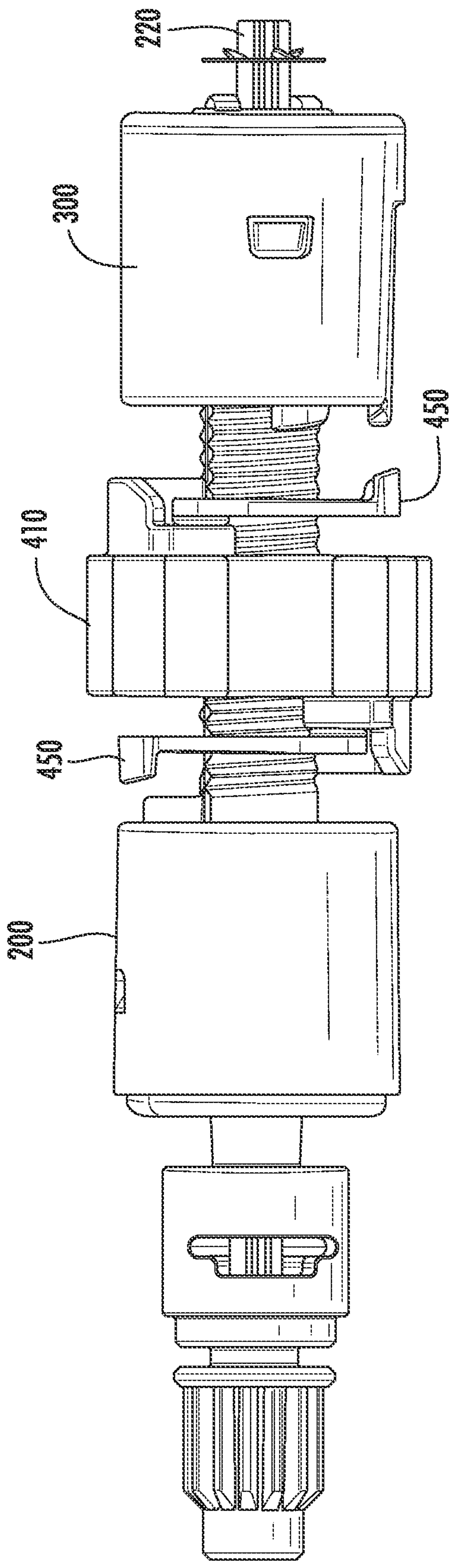
FIG. 26 is a side, perspective view illustrating an example of an embodiment incorporating multiple limit stop assemblies in accordance with an embodiment of the present disclosure.

Referring to FIG. 26, in one example of a method of use, it is envisioned that the multiple limit stop assemblies may be used within a single architectural-structure covering to set both the extension and retraction limits. For example, in one example of an embodiment, limit stop assembly 200 and limit stop assembly 300 can be utilized in an architectural-structure covering to set multiple travel limits of the covering. In one example of an embodiment, limit stop assembly 200 can be used to set the retraction limit of the covering while limit stop assembly 300 can be used to set the extension limit of the covering, or vice-versa. That is, in one example of an embodiment, the limit stop assembly 200 can be used to set a travel limit of the covering by initially moving the covering from a first position to a second position, such as, for example, a desired limit position of the covering for the second position, and then moving the covering back towards the first position so that future, continued operation of the architectural-structure covering is constrained by the desired limit as-set by initially moving the covering from the second position toward the first position. Thereafter, the limit stop assembly 300 can be used to set a travel limit of the covering by initially moving the covering from the second position to the first position, such as, for example, a desired limit position of the covering for the first position, and then moving the covering back towards the second position so that future, continued operation of the architectural-structure covering is constrained by the desired limit as-set by initially moving the covering from the first position toward the second position. As shown, the multiple limit stop assemblies 200, 300 can be positioned on a single central shaft such as, for example, central shaft 220. The limit stop assemblies 200, 300 may incorporate a single limit nut such as, for example, limit nut 410 having dual actuators 450 (e.g., one positioned on either side) for interacting with limit stop assembly 200 and limit stop assembly 300, respectively.

While the present disclosure makes reference to certain embodiments, numerous modifications, alterations, and changes to the described embodiments are possible without departing from the sphere and scope of the present disclosure, as defined in the appended claim(s). Accordingly, it is intended that the present disclosure not be limited to the described embodiments, but that it has the full scope defined by the language of the following claims, and equivalents thereof.

The foregoing description has broad application. It should be appreciated that the concepts disclosed herein may apply to many types of coverings, in addition to the roller-type coverings described and depicted herein. Similarly, it should be appreciated that the concepts disclosed herein may apply to many types of operating systems, in addition to the operating system described and depicted herein. For example, the concepts may apply equally to any type of architectural-structure covering having a covering movable across an architectural structure. The discussion of any embodiment is meant only to be explanatory and is not intended to suggest that the scope of the disclosure, including the claims, is limited to these embodiments. In other words, while illustrative embodiments of the disclosure have been described in detail herein, it is to be understood that the inventive concepts may be otherwise variously embodied and employed, and that the appended claims are intended to be construed to include such variations, except as limited by the prior art.

The foregoing discussion has been presented for purposes of illustration and description and is not intended to limit the disclosure to the form or forms disclosed herein. For example, various features of the disclosure are grouped together in one or more aspects, embodiments, or configurations for the purpose of streamlining the disclosure. However, it should be understood that various features of the certain aspects, embodiments, or configurations of the disclosure may be combined in alternate aspects, embodiments, or configurations. Moreover, the following claims are hereby incorporated into this Detailed Description by this reference, with each claim standing on its own as a separate embodiment of the present disclosure.

As used herein, an element or step recited in the singular and proceeded with the word “a” or “an” should be understood as not excluding plural elements or steps, unless such exclusion is explicitly recited. Furthermore, references to “one embodiment” of the present disclosure are not intended to be interpreted as excluding the existence of additional embodiments that also incorporate the recited features.

The phrases “at least one”, “one or more”, and “and/or”, as used herein, are open-ended expressions that are both conjunctive and disjunctive in operation. The terms “a” (or “an”), “one or more” and “at least one” can be used interchangeably herein. All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader’s understanding of the present disclosure, and do not create limitations, particularly as to the position, orientation, or use of this disclosure. Connection references (e.g., engaged, attached, coupled, connected, and joined) are to be construed broadly and may include intermediate members between a collection of elements and relative to movement between elements unless otherwise indicated. As such, connection references do not necessarily infer that two elements are directly connected and in fixed relation to each other. All rotational references describe relative movement between the various elements. Identification references (e.g., primary, secondary, first, second, third, fourth, etc.) are not intended to connote importance or priority, but are used to distinguish one feature from another. The drawings are for purposes of illustration only and the dimensions, positions, order and relative to sizes reflected in the drawings attached hereto may vary.

What is claimed:

1. A method for automatically setting a travel limit of an architectural-structure covering, the architectural-structure covering including a central shaft, a rotatable member rotatable relative to the central shaft, a covering coupled to the rotatable member and movable between a first position and a second position via rotation of the rotatable member, and a limit stop assembly movable between a first state of operation and a second state of operation, the method comprising:

providing the covering of the architectural-structure covering in the first position;

moving the covering from the first position towards the second position; and upon reaching the second position, moving the covering towards the first position;

wherein moving the covering from the second position to the first position automatically transitions the limit stop assembly from the first state of operation to the second state of operation thus setting the travel limit of the covering at the second position;

wherein in the first state of operation, the limit stop assembly is arranged and configured to enable the covering to be moved from the first position to the second position to set the travel limit of the covering, and in the second state of operation, the travel limit is set.

2. The method of claim 1, wherein the second position is a desired position for the travel limit for continued operation of the architectural-structure covering.

3. The method of claim 1, wherein the first position is an extended position of the covering, the second position is a retracted position of the covering, and the travel limit is a retracted limit of the covering.

4. The method of claim 1, wherein the first position is a retracted position of the covering, the second position is an extended position of the covering, and the travel limit is an extension limit of the covering.

5. The method of claim 1, wherein the limit stop assembly includes a limit nut configured to engage the rotatable member so that rotation of the rotatable member rotates the limit nut, wherein:

in the first state of operation, the limit nut rotates unimpeded to enable continued rotation of the rotatable member so that movement of the covering between the first and second positions is permitted; and in the second state of operation, the travel limit is set so that rotation of the limit nut beyond the travel limit is prevented, thus limiting rotation of the rotatable member and the covering.

6. The method of claim 5, wherein the limit stop assembly further comprises:

a screw shaft mounted on the central shaft, the limit nut threadably coupled to the screw shaft; and a collar selectively movable between a first collar position and a second collar position, wherein in the first state of operation of the limit stop assembly, the collar is in the first collar position where the collar engages a first end of the screw shaft, and in the second state of operation of the limit stop assembly, the collar is in the second collar position where the collar disengages the first end of the screw shaft.

7. The method of claim 6, further comprising a hub mounted on the central shaft, the hub being in contact with the first end of the screw shaft;

wherein:

in the first collar position, the collar engages the screw shaft but is disengaged from the hub so that rotation of the screw shaft relative to the hub is permitted; and in the second collar position, the collar engages the screw shaft and the hub so that rotation of the screw shaft relative to the hub is prevented.

8. The method of claim 7, further comprising a plurality of hub splines disposed at an end of the hub, the plurality of hub splines contacting a plurality of screw shaft splines disposed at the first end of the screw shaft, the hub splines and the shaft splines are arranged and configured to selectively couple the hub to the first end of the screw shaft so that rotation of the screw shaft relative to the hub is initially prevented.

9. The method of claim 8, further comprising a plurality of collar ridges formed on an inner surface of the collar, wherein the plurality of collar ridges are operably engaged with a plurality of shaft ridges formed on an outer circumference of the first end of the screw shaft when the collar is in the first and second collar positions.

10. The method of claim 9, further comprising a plurality of hub ridges formed on an outer circumference of the hub, the plurality of collar ridges being operably engaged with the plurality of shaft ridges formed on the outer circumference of the first end of the screw shaft and the plurality of hub ridges formed on the outer circumference of the hub when the collar is in the second collar position.

11. The method of claim 10, wherein:

the hub further includes a plurality of hub splines for engaging a plurality of screw shaft splines formed at the first end of the screw shaft; and the hub splines, the screw shaft splines, the collar ridges, the screw shaft ridges and the hub ridges are adapted and configured so that, in the first and second collar positions, the hub splines and the screw shaft splines are in operative engagement with each other, and the hub ridges and the screw shaft ridges are in alignment with each other.

12. The method of claim 7, further comprising a biasing member for biasing the hub into contact with the first end of the screw shaft.

13. The method of claim 7, wherein the collar comprises:

a hollow body defining a cavity for receiving at least a portion of the hub therein; and a tab having a projection extending towards the cavity, in the first collar position, the projection releasably coupling to the first end of the screw shaft to prevent the collar from engaging the hub.

14. The method of claim 13, wherein in the first collar position, the projection on the tab on the collar contacts an abutment surface formed on the first end of the screw shaft.

15. The method of claim 6, wherein:

the limit nut includes an actuator;

rotation of the limit nut and the actuator in a first direction causes the actuator to move past the collar so that the collar remains in the first collar position; and rotation of the limit nut and the actuator in a second direction transitions the collar from the first collar position to the second collar position.

16. The method of claim 15, wherein:

the actuator on the limit nut includes an actuator tab;

rotation of the limit nut and the actuator in the first direction causes the actuator tab to slide past a tab on the collar so that the collar remains in the first collar position; and rotation of the limit nut and the actuator in the second direction causes the actuator tab to contact the tab on the collar to transition the collar from the first collar position to the second collar position.

17. A method for automatically setting a travel limit an architectural-structure covering, the architectural-structure covering including a covering movable between a first retracted position and a second extended position and a limit stop assembly movable between a first state of operation and a second state of operation, the method comprising:

providing the covering in the first retracted position, the limit stop assembly being in the first state of operation;

moving the covering from the first retracted position towards the second extended position; and upon reaching the second extended position, retracting the covering towards the first retracted position;

wherein moving the covering from the second extended position to the first retracted position automatically transitions the limit stop assembly from the first state of operation to the second state of operation thus setting the travel limit of the covering at the second extended position for future subsequent use;

wherein in the first state of operation, the limit stop assembly is arranged and configured to enable the covering to be moved from the first retracted position to the second extended position to set the travel limit of the covering, and in the second state of operation, the travel limit is set.

18. The method of claim 17, wherein the second extended position is a desired extension position for the travel limit for continued operation of the architectural-structure covering.

19. The method of claim 17, wherein the architectural-structure covering includes a central shaft, a rotatable member rotatable relative to the central shaft, and the covering coupled to the rotatable member; and the limit stop assembly includes:

a screw shaft mounted on the central shaft, the screw shaft including a first end, a second end, and a longitudinal length;

a limit nut configured to engage the rotatable member so that rotation of the rotatable member rotates the limit nut, the limit nut arranged and configured to travel along the longitudinal length of the screw shaft;

a hub mounted on the central shaft, the hub being in contact with the first end of the screw shaft; and a collar selectively movable between a first collar position and a second collar position;

wherein:

in the first state of operation, the collar is in the first collar position where the collar engages the first end of the screw shaft but is disengaged from the hub so that rotation of the screw shaft relative to the hub is permitted, the limit nut rotates unimpeded to enable continued rotation of the rotatable member to enable the covering to move between the first and second positions; and in the second state of operation, the collar is in the second collar position where the collar engages the screw shaft and the hub so that rotation of the screw shaft relative to the hub is prevented, in the second state of operation, rotation of the limit nut beyond the travel limit is prevented so that the travel limit is set and rotation of the rotatable member and the covering is limited.

* * * * *